(12) United States Patent
Brady

(10) Patent No.: US 11,531,565 B2
(45) Date of Patent: Dec. 20, 2022

(54) TECHNIQUES TO GENERATE EXECUTION SCHEDULES FROM NEURAL NETWORK COMPUTATION GRAPHS

(71) Applicant: Intel Corporation, Santa Clara, CA (US)

(72) Inventor: John Brady, Dublin (IE)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 16/870,190

(22) Filed: May 8, 2020

(65) Prior Publication Data

US 2020/0272515 A1 Aug. 27, 2020

(51) Int. Cl.
*G06F 9/48* (2006.01)
*G06F 9/50* (2006.01)
*G06F 9/52* (2006.01)
*G06F 9/54* (2006.01)
*G06N 3/04* (2006.01)
*G06F 13/28* (2006.01)

(52) U.S. Cl.
CPC .......... *G06F 9/4881* (2013.01); *G06F 9/5016* (2013.01); *G06F 9/5066* (2013.01); *G06F 9/522* (2013.01); *G06F 9/546* (2013.01); *G06F 13/28* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 8,689,231 | B2* | 4/2014 | Milnor | G06F 9/4881 717/109 |
| 10,310,896 | B1* | 6/2019 | Kichak | G06F 9/4843 |
| 2011/0252264 | A1* | 10/2011 | Solinas | G06F 9/52 713/400 |
| 2012/0117138 | A1* | 5/2012 | Blocksome | H04L 67/40 709/201 |
| 2013/0305258 | A1* | 11/2013 | Durant | G06F 9/4881 718/106 |
| 2014/0130056 | A1* | 5/2014 | Goodman | G06F 9/5044 718/104 |
| 2015/0268992 | A1* | 9/2015 | Fan | G06F 9/4881 718/106 |
| 2018/0182153 | A1* | 6/2018 | Potter | G06T 1/60 |

* cited by examiner

*Primary Examiner* — Abu Zar Ghaffari
(74) *Attorney, Agent, or Firm* — KDB Firm PLLC

(57) ABSTRACT

Techniques are described for a compiler scheduling algorithm/routine that utilizes backtracking to generate an execution schedule for a neural network computation graph using a neural network compiler intermediate representation of hardware synchronization counters. The hardware synchronization counters may be referred to as physical barriers, hardware (HW) barriers, or barriers and their intermediate representations may be referred to as barrier tasks or barriers. Backtracking is utilized to prevent an available number of hardware barriers from being exceeded during performance of an execution schedule. An execution schedule may be a computation workload schedule for neural network inference applications. An execution schedule may also be a first in first out (FIFO) schedule.

25 Claims, 33 Drawing Sheets

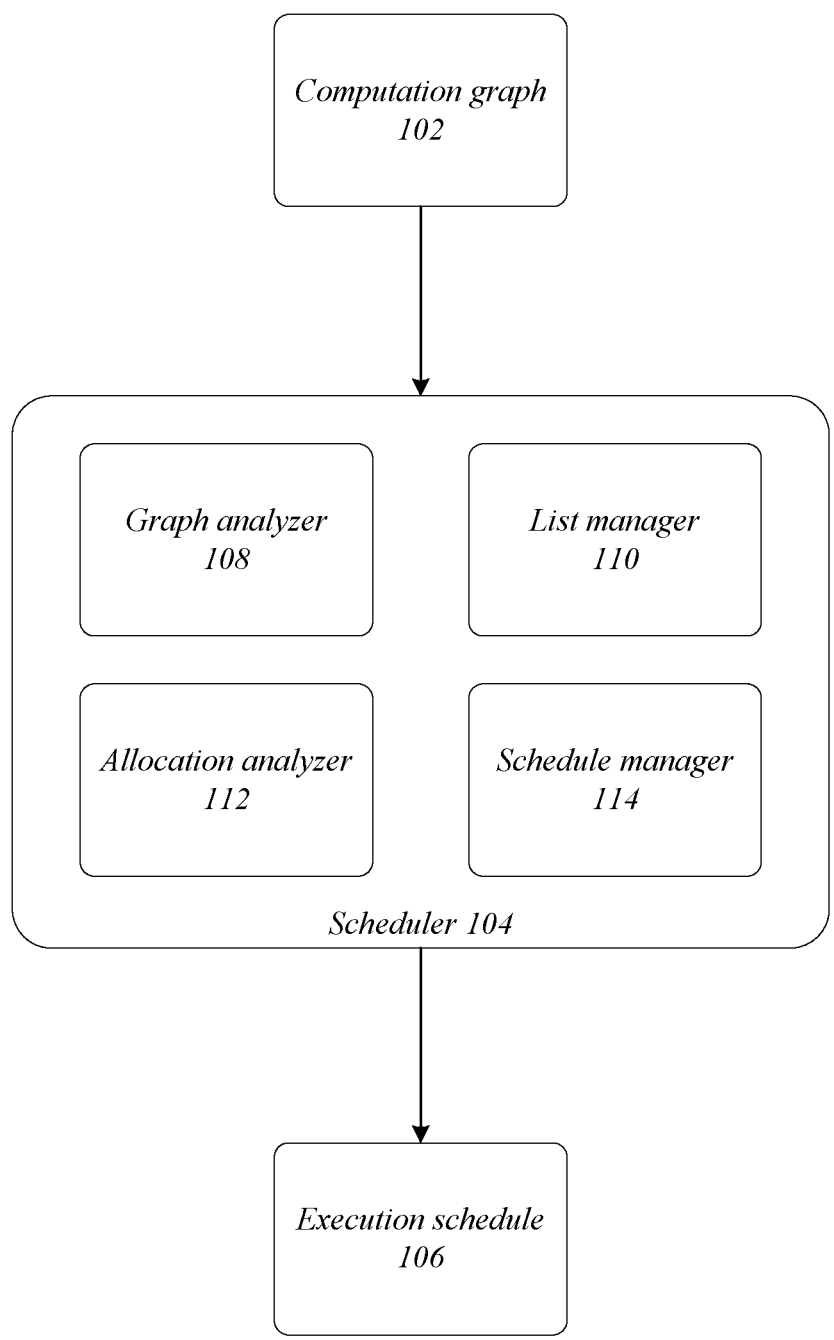

200A

200C

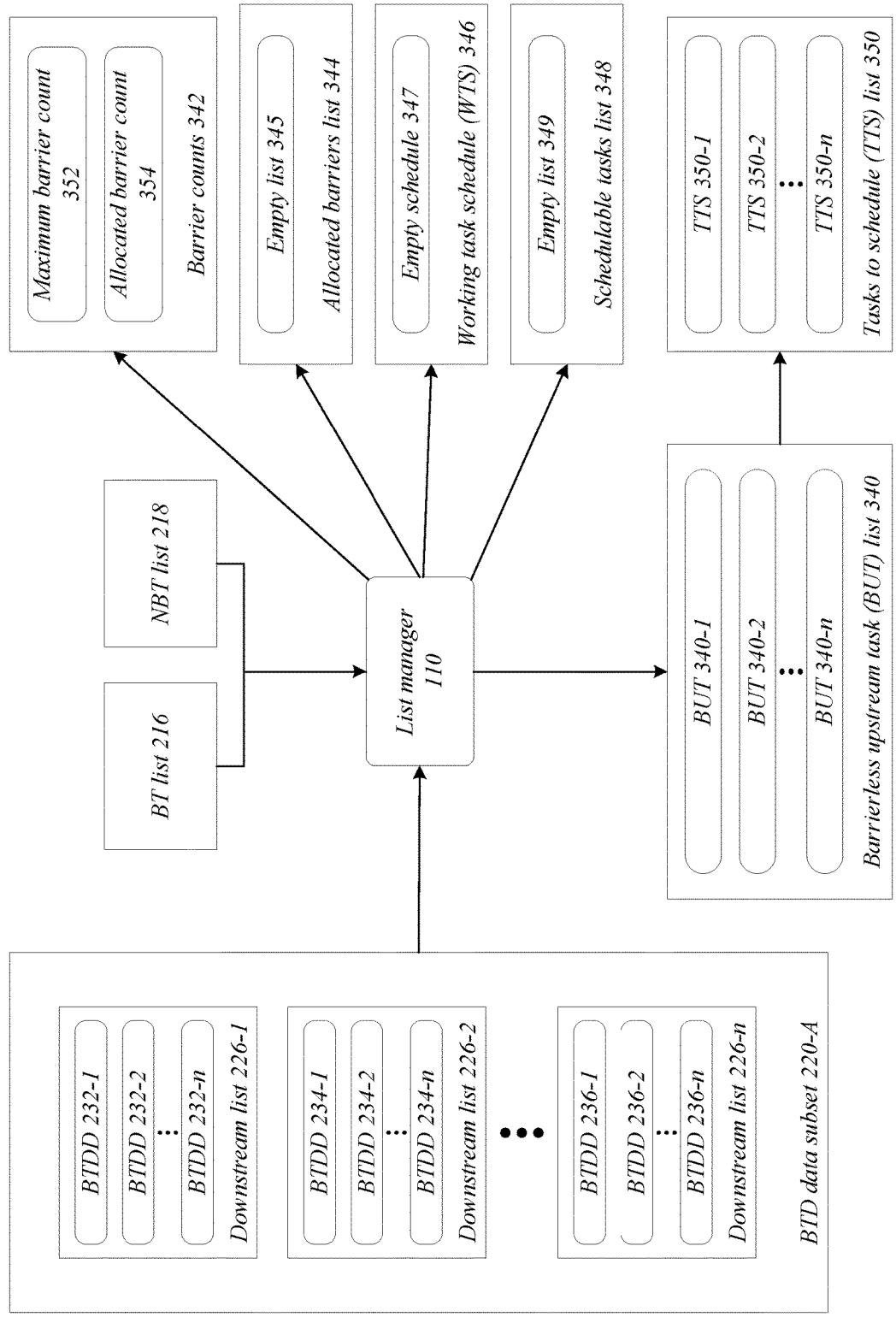

300B

400A

400B

500A

500C

600

Computation graph 602

700A

700B

800A

800B

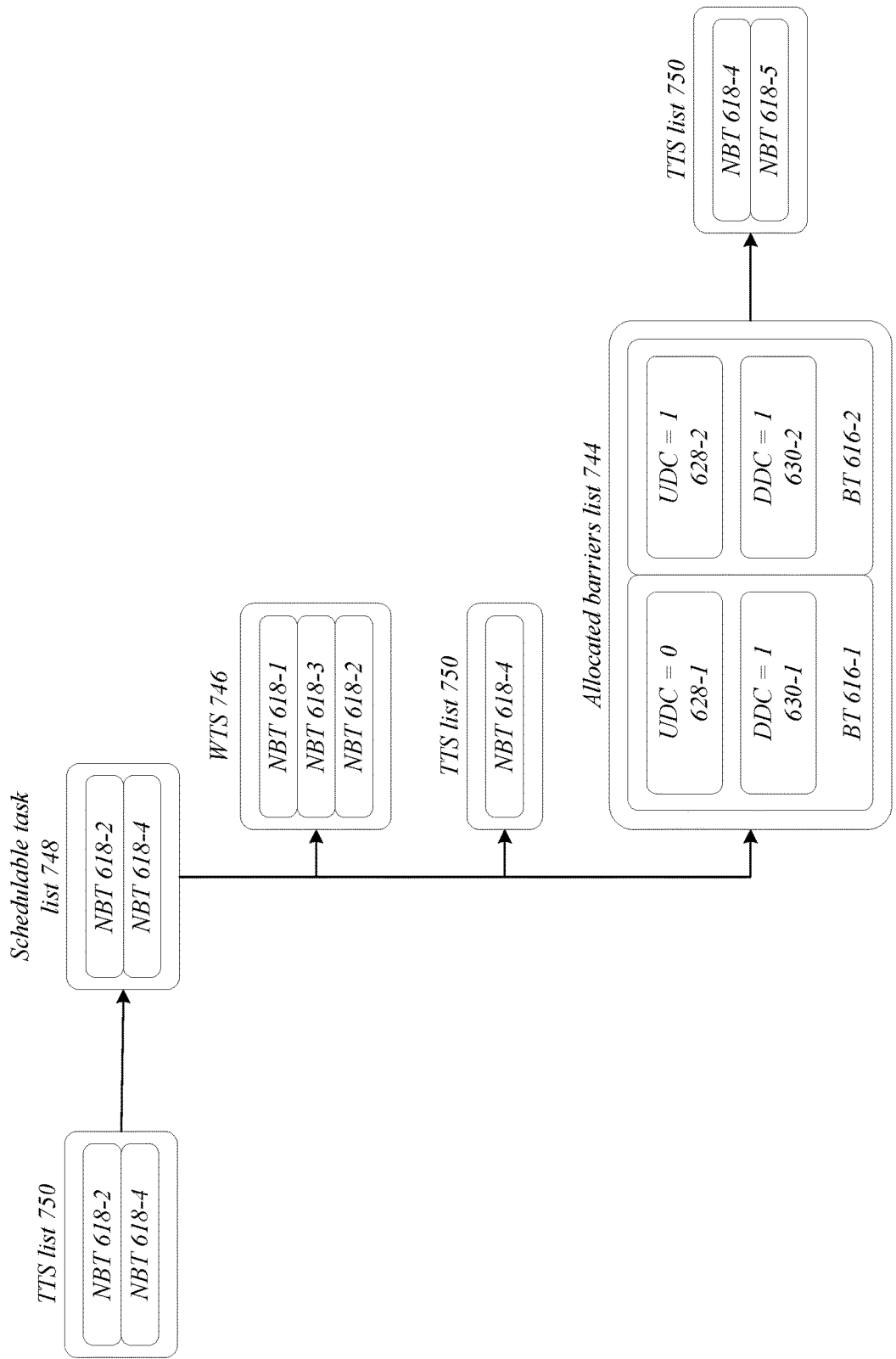

900B

1000B

1100A

*1100B*

Computation graph 602

Storage Medium 1600

*Computer Executable Instructions for 1500*

TECHNIQUES TO GENERATE EXECUTION SCHEDULES FROM NEURAL NETWORK COMPUTATION GRAPHS

BACKGROUND

In computing, scheduling is a method by which work is assigned to resources that complete the work. The work may be divided into tasks, such as virtual computation elements (e.g., threads, processes, or data flows), which are in turn scheduled onto hardware resources, such as processors, network links, or expansion cards. Scheduling is fundamental to computation itself, and an intrinsic part of the execution model of a computer system; the concept of scheduling makes it possible to have computer multitasking with a single central processing unit (CPU). Oftentimes, tasks are scheduled according to an execution schedule. An execution schedule may define the order to execute tasks to complete work, and may be generated based on dependencies and/or resource requirements of the tasks.

BRIEF DESCRIPTION OF THE DRAWINGS

FIG. 1 illustrates an exemplary operating environment for a scheduler to generate an execution schedule based on a computation graph according to one or more embodiments described herein.

FIGS. 3A and 3B illustrate exemplary aspects of a list manager according to one or more embodiments described herein.

FIGS. 9A-9B illustrate exemplary fourth aspects of generating an execution schedule based on a computation graph according to one or more embodiments described herein.

FIG. 16 illustrates an embodiment of a storage medium according to one or more embodiments described herein.

DETAILED DESCRIPTION

Figure 2A:
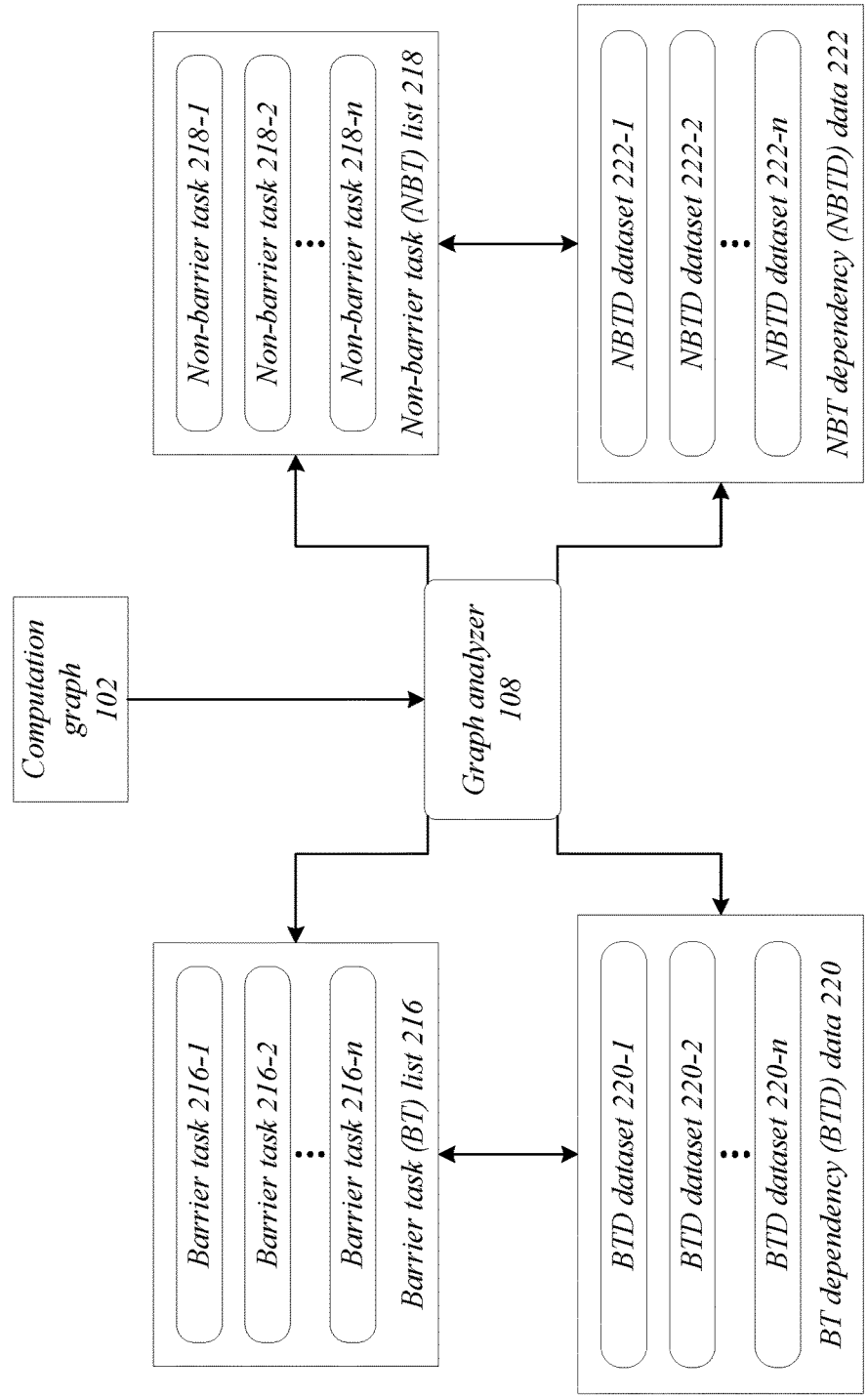
FIGS. 2A-2D illustrate exemplary aspects of a graph analyzer according to one or more embodiments described herein.

Various embodiments are generally directed to techniques to generate execution schedules from neural network computation graphs, such as for performance by a heterogeneous processor. Some embodiments are particularly directed to improvements for scheduling by a compiler that utilizes backtracking to generate an execution schedule for a neural network computation graph using a neural network compiler intermediate representation of hardware synchronization counters. The hardware synchronization counters may be referred to as physical barriers, hardware (HW) barriers, or barriers and their intermediate representations may be referred to as barrier tasks or barriers. Many embodiments utilize backtracking to prevent an available number of hardware barriers from being exceeded during performance an execution schedule. In several embodiments, the execution schedule may be a computation workload schedule for neural network inference applications. In one or more embodiments, the execution schedule may be a first in first out (FIFO) schedule. These and other embodiments are described and claimed.

Some challenges facing the generation of execution schedule include providing efficient and reliable schedules that effectively utilize parallelism, such as via HW accelerator resources of a heterogeneous processor. Oftentimes schedules may include one or more of the following shortcomings: fail to utilize hardware innovations for accelerating task synchronization; be incompatible with run-time software (SW) methods for controlling/synchronizing tasks; enable execution without exceeding hardware resource limitations; require excessive execution time, power consumption, memory utilization, and/or communication overhead; and unacceptable compilation times. For example, a compiler scheduling algorithm could schedule all tasks to run consecutively, with no parallelism. However, this would take an excessive amount of time to run, and not fully utilize available HW accelerator resources.

Also, methods to retarget tensor flow processes to heterogeneous processor components lead to undue complications and limited adaptability. For example, a new backend may be needed, which can contribute to significant engineering time/resources and results in hardware being tightly coupled with tensor flow model. In such examples, the new backend may be needed to provide one or more of an abstract computer resource interface to expose at compile time the compute resources that are available on a target, a mechanism to control HW barrier implementation details and/or a mechanism to control SW implementation details.

Adding further complexity, the compiler must enable the run-time hardware/software to synchronize the execution of tasks which may overlap in time. Further, different algorithms may be utilized by the compiler to prepare schedules depending upon the user/application requirements optimizing for compile time, program execution time, program power consumption, and/or image throughput (e.g., frames per second). Accordingly, the methods used by the compiler to generate the schedules must be flexible enough to support multiple complex optimizations. These and other factors may result in execution schedules and/or compilers with excessive overhead, limited applicability, and poor adaptability. Such limitations can drastically reduce the usability and performance of the execution schedules and/or compilers, contributing to inefficient systems, devices, and techniques.

In light of the above challenges, several embodiments described herein provide an algorithm that can generate optimal FIFO task schedules that can leverage the representation of synchronization tasks in the compiler intermediate representation (IR). Further, embodiments may enable/provide one or more of optimal dynamic scheduling, run-time SW with required synchronization data, and the use of HW barriers. Many embodiments may leverage hardware characteristics of heterogeneous processors, including heterogeneous vision processing units (VPUs), to produce execution schedules that enable improved inference performance on corresponding heterogeneous processors.

More generally, various embodiments described herein include the ability to generate an execution schedule that factors in available resources and parallelism, such as an available number of hardware barriers and/or a heterogeneous processor comprising neural network and image processing accelerators. For instance, by factoring in an available number of hardware barriers, the execution schedules may enable the run-time HW/SW to synchronize the execution of tasks, including those that overlap in time. Many embodiments include a scheduler, such as for a compiler, that efficiently and reliably generates execution schedules based on available resources. For example, the scheduler may comprise a configurable algorithm that generates a feasible task FIFO schedule that guarantees not to require more than available hardware barriers to execute the schedule. In several embodiments, the execution schedules may be for neural network inference applications, such as those executed by vision processing units (VPUs). The scheduler may support multiple, customizable, interdependent optimizations. For example, the scheduler may be able to optimize for one or more of compile time, program execution time, program power consumption, and image throughput.

In many embodiments, the schedules may utilize hardware innovations that accelerate task synchronization. The schedules may be compatible with run-time SW methods for controlling/synchronizing the tasks. The schedules may guarantee that all tasks can run without exceeding hardware resource limitations. The schedules may optimize one or more of compilation time, execution time, power consumption, memory utilization, and communication overhead. In several embodiments, the schedules are for a FIFO-based, real-time, dynamic task scheduling architecture, such as one that supports dynamic allocation of computation resources at run-time. In several such embodiments, dynamic scheduling of compute tasks indicates that tasks at the output of the ready queue can be allocated to whichever appropriate computation resource(s) that are/is available at the time.

In one or more embodiments, HW barriers may be a physical implementation for real-time task synchronization. For instance, the HW barriers may be physical implementation of a counting semaphore. In many embodiments HW barriers may comprise a HW register. Accordingly, the scheduler may generate execution schedules that will not exceed a maximum number of available HW registers. In several embodiments, the barriers may implement a counter design that allows aggregation of multiple dependencies in a compact and fast implementation. The use of HW barriers for task synchronization can improve run-time performance versus a SW based synchronization approach. In some embodiments, the scheduler, and/or a compiler implementing it, may implement a compatible task synchronization management scheme to support the use of HW barriers during run-time. In various embodiments, run-time may refer to during performance of the execution schedule, such as for an inference process.

In many embodiments, the scheduler may utilize an abstract computer resource interface to expose at compile time the compute resources that are available on a target (e.g. executing VPU). Additionally, or alternatively, the scheduler may provide a mechanism to control HW barrier implementation details and/or a mechanism to control SW implementation details. In several embodiments, barrier tasks may permit optimal dynamic scheduling onto hardware compute resources while preserving the dependencies required by the original computation network. Further, barrier tasks may capture information needed by the run-time SW to utilize the HW barrier devices for task synchronization. The barrier tasks may provide a method to represent operational synchronization dependencies in the computation graph intermediate representation.

In these and other ways, components described here may identify methods to generate execution schedules that adapt to available compute resources, increase efficiency, decrease performance costs, decrease computational cost, and/or reduce resource requirements, in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical field of execution schedule generation, neural networks, computer inferencing, computer vision, heterogeneous processors, parallel processing, accelerator integration, and/or the like.

In several embodiments, components described herein may provide specific and particular manners of generating optimal FIFO task schedules that can leverage the representation of synchronization tasks in the compiler intermediate representation (IR), enable dynamic scheduling, provide run-time SW with required synchronization data, and/or enable the use of HW barriers. In many embodiments, one or more of the components described herein may be implemented as a set of rules that improve computer-related technology by allowing a function not previously performable by a computer that enables an improved technological result to be achieved. For example, the function allowed may include generating an execution schedule that no more than target number of HW barriers will be required to perform the execution schedule. Many embodiments described herein provide tools to enable the efficient compilation of deep neural networks that maximize hardware utilization and inference performance, such as with respect to power or image throughput. Further, barriers may be defined not by the structure of the original computation graph, but by scheduling and optimization dependencies created by the scheduler (and/or compiler).

With general reference to notations and nomenclature used herein, one or more portions of the detailed description, which follows, may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an exemplary operating environment 100 for a scheduler 104 to generate an execution schedule 106 based on a computation graph 102 according to one or more embodiments described herein. The scheduler 104 of operating environment 100 includes a graph analyzer 108, a list manager 110, an allocation analyzer 112, and a schedule manager 114. In one or more embodiments described herein, the components of scheduler 104 may interoperate to generate the execution schedule 106 based on computation graph 102. It will be appreciated that scheduler 104 and/or the components thereof are used in conjunction with the description of exemplary embodiments, however, the functionalities, techniques, capabilities, etcetera described herein may be implemented with additional and/or different components without departing from the scope of this disclosure. In many embodiments, the scheduler 104 may comprise one or more parts of a compiler, such as a memory consistency model (MCM) compiler. Embodiments are not limited in this context.

Figure 6:
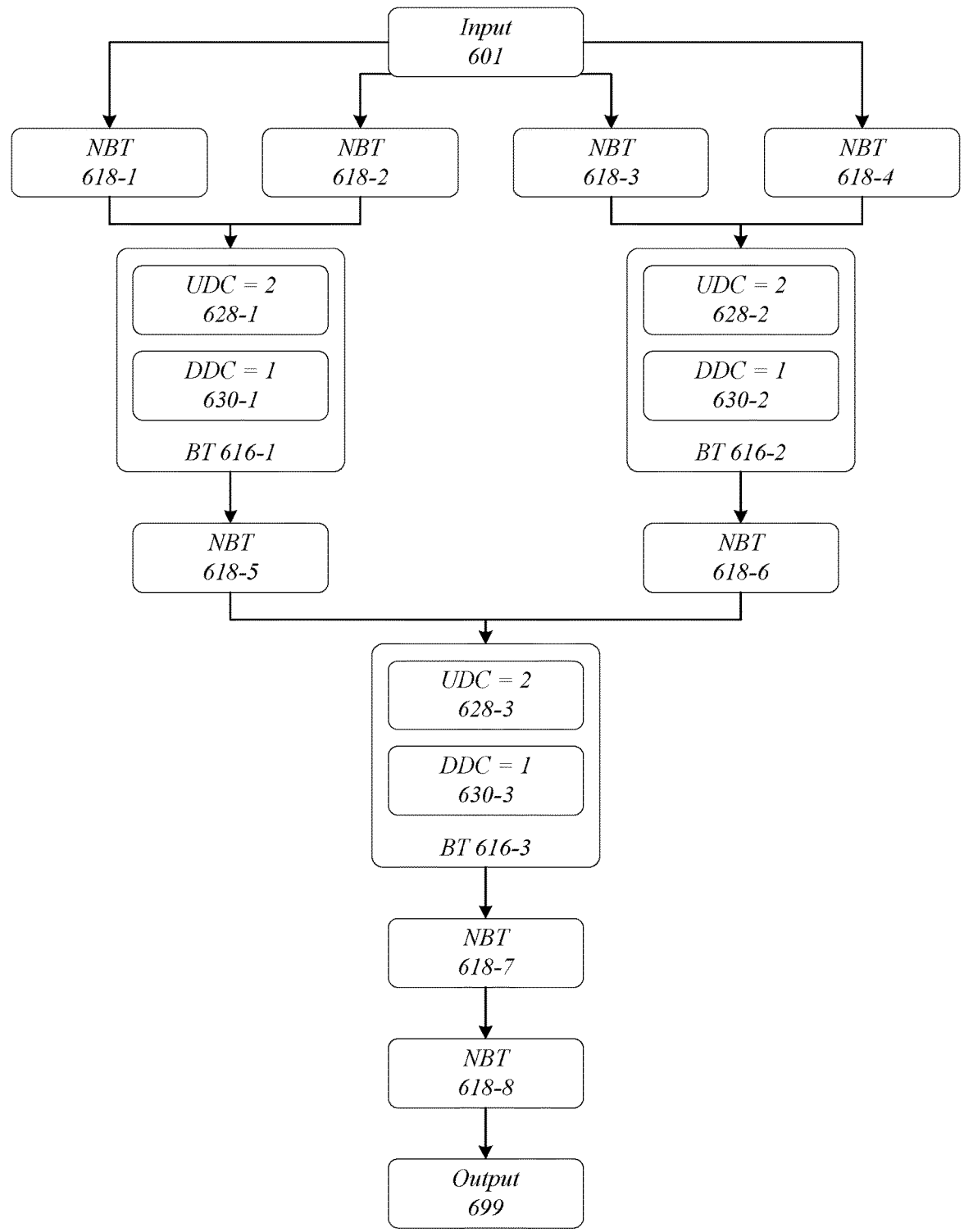
FIG. 6 illustrates exemplary first aspects of generating an execution schedule based on a computation graph according to one or more embodiments described herein.

During compilation of a trained neural network into a serialized binary for inference on a target processing system, such as a heterogeneous VPU, defining HW barrier use may be necessary to synchronize the serial/parallel operation of tasks in the computation graph 102. In some embodiments, definition of the HW barrier usage may be required both for optimal resource scheduling and for correctness of neural network inferences. As previously mentioned, to facilitate HW barrier usage, embodiments described herein may utilize a control operation called a barrier task. In several embodiments, a barrier task may comprise a data object that is inserted into an IR of the computation graph 102, such as using control flows. In several such embodiments, barrier tasks may be inserted by the compiler. An exemplary computation graph is illustrated in FIG. 6. In some embodiments, barrier task properties and/or data objects may be stored in a HW register. Table 1, below, provides an exemplary set of properties of a barrier task data object as represented in the computation graph IR.

TABLE 1

| Properties | Description |
| --- | --- |
| ID | A unique identifier of a barrier (virtual barrier index). |
| index | Under static barrier allocated mode: Specific HW barrier allocated to this barrier task. (HW barriers may be re-used, so this is not a unique identifier). Under dynamic barrier allocation mode: Same as ID. |
| group | HW barrier group, a hierarchical structure of HW resources allowing parallel processing of multiple inferences. Each process is only aware of its own barriers. |
| numProducers | The number of preceding operations required to update this barrier. Upon completion, a producer will cause the HW barrier counter to decrement. |
| numConsumers | The number of operations waiting for this barrier to be set (e.g., counter reaches zero). |
| producers | A list of the operations that will cause the HW barrier counter to decrement when they complete. |
| consumers | A list of operations that will wait for this barrier to be set. |
| requiredConcurrentBarriers | A list of the barriers that must be concurrent (alive) with this barrier for correct sequential flow through the computation graph. |
| possibleConcurrentBarriers | A list of the barriers that may be concurrent with this |

TABLE 1-continued

| Properties | Description |
| --- | --- |
| | barrier, enabling, parallelism under dynamic scheduling of operations. |
| color | Color assignment resulting from Barrier-Interference-Graph (BIG) coloring. |
| maxConcurrentBarriers | Maximum number of barriers which may be alive while this barrier is alive. |

In many embodiments, insertion of barrier tasks into the computation graph 102 may allow optimization and scheduling algorithms to manipulate the attributes and its relation/dependencies to other tasks. In various embodiments herein, a downstream dependency may comprise a consumer and an upstream dependency may comprise a producer. Accordingly, the barrier tasks may enable HW barriers control the start of consumer tasks that are dependent upon the completion of preceding producer dependencies. As will be discussed in more detail below, such as with respect to FIGS. 2A-2D, in various embodiments, one or more properties of the barrier task may be included in and/or determined based on BTD data (e.g., BTD data 220) and/or NBTD data (e.g., NBTD data 222). In several embodiments, scheduler 104 may utilize backtracking to prevent a maximum number of HW barriers from being exceeded. The backtracking scheduling algorithms provided herein are merely exemplary and other manipulating functions may include merging, elimination, live-ness analysis, and/or resource allocation.

More generally, FIGS. 2A-5C may illustrate various portions of generating an execution schedule with scheduler 104. Further, FIGS. 6-13 may step through aspects of an overall scheduling algorithm illustrated in process flow 1400 of FIGS. 14A-14C while demonstrating how data, such as lists, schedules, computation graphs, and/or barrier tasks, is manipulated to arrive at the final execution schedule. In some embodiments, the various portions of generating an execution schedule with scheduler 104 in FIGS. 2A-5C may be the same or similar to one or more portions of the overall scheduling algorithm illustrated in process flow 1400 of FIGS. 14A-14C.

FIGS. 2A-2D illustrates exemplary aspects of a graph analyzer 108 in environments 200A, 200B, 200C, 200D according to one or more embodiments described herein. In environment 200A, graph analyzer 108 may generate/determine/access/update one or more of a barrier task (BT) list 216, a non-barrier task (NBT) list 218, BT dependency (BTD) data 220, and NBT dependency (NBTD) data 222 based, at least in part, on computation graph 102. As shown in environment 200B, BT list 216 may include one or more barrier tasks 216-1, 216-2, 216-n and BTD data 220 may include a BTD dataset 220-1, 220-2, 220-n for each barrier task in the BT list 216. As shown in environment 200C, NBT list 218 may include one or more non-barrier tasks 218-1, 218-2, 218-n and NBTD data 222 may include a NBTD dataset 222-1, 222-2, 222-n for each non-barrier task in the NBT list 218. Environment 200D illustrates a process flow 280 according to one or more embodiments herein. In some embodiments, the process flow 280 of environment 200D may be implemented by the graph analyzer 108. Embodiments are not limited in this context.

In many embodiments, one or more portions of the lists 216, 218 and/or the data 220, 222 may be determined based on computation graph 102. For example, graph analyzer 108 may traverse the computation graph 102 to determine one or more portions of the BT list 216, the NBT list 218, the BTD data 220, and/or the NBTD data 222. In various embodiments, one or more portions of the lists 216, 218 and/or the data 220, 222 may include data accessed via an abstract computer resource interface that is exposed at compile time. In some embodiments, one or more portions of the lists 216, 218 and/or the data 220, 222 may include barrier task properties. Further, one or more aspects of the lists 216, 218 and/or the data 220, 222 may be manipulated (e.g., updated or backtracked) during generation of an execution schedule.

Figure 2B:
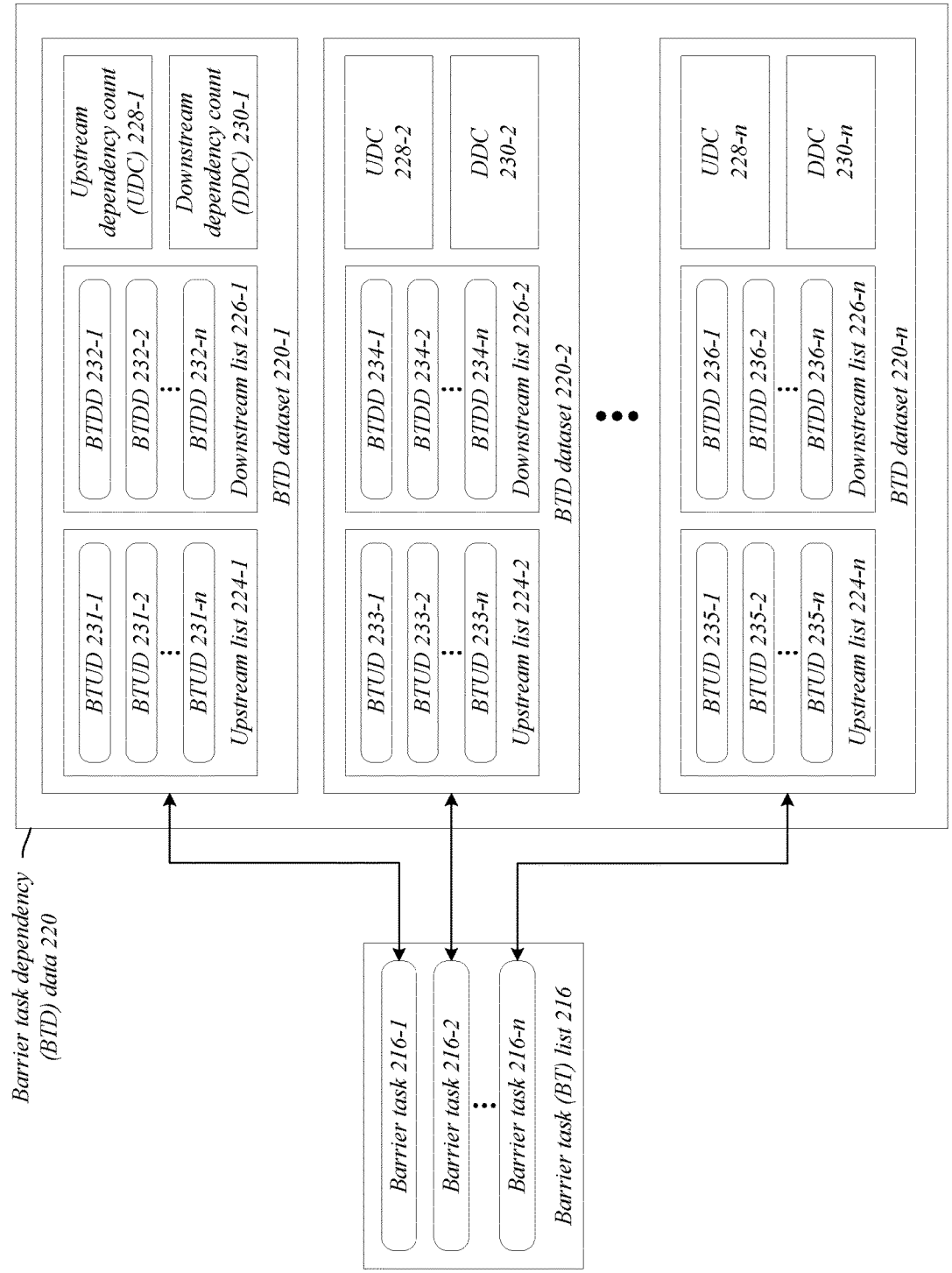

Referring to FIG. 2B, BTD data 220 may include BTD dataset 220-1 that corresponds to barrier task 216-1, BTD dataset 220-2 that corresponds to barrier task 216-2, and BTD dataset 220-n that corresponds to barrier task 216-n. BTD dataset 220-1 may include an upstream list 224-1 with one or more barrier task upstream dependencies (BTUD) 231-1, 231-2, 231-n, a downstream list 226-1 with one or more barrier task downstream dependencies (BTDD) 232-1, 232-2, 232-n, an upstream dependency count (UDC) 228-1, and a downstream dependency count (DDC) 230-1; BTD dataset 220-2 may include an upstream list 224-2 with one or more BTUD 233-1, 233-2, 233-n, a downstream list 226-2 with one or more BTDD 234-1, 234-2, 234-n, a UDC 228-2, and a DDC 230-2; and BTD dataset 220-n may include an upstream list 224-n with one or more BTUD 235-1, 235-2, 235-n, a downstream list 226-n with one or more BTDD 236-1, 236-2, 236-n, a UDC 228-n, and a DDC 230-n. In one or more embodiments, a BTUD may comprise a producer of a corresponding barrier task and a BTDD may comprise a consumer of the corresponding barrier task. Additionally, or alternatively, UDCs may correspond to the numProducers property and DDCs may correspond to the numConsumers property of a barrier task data object. In one or more embodiments described herein, dependencies may only refer to direct dependencies (i.e., directly connected in the computation graph).

Figure 2C:
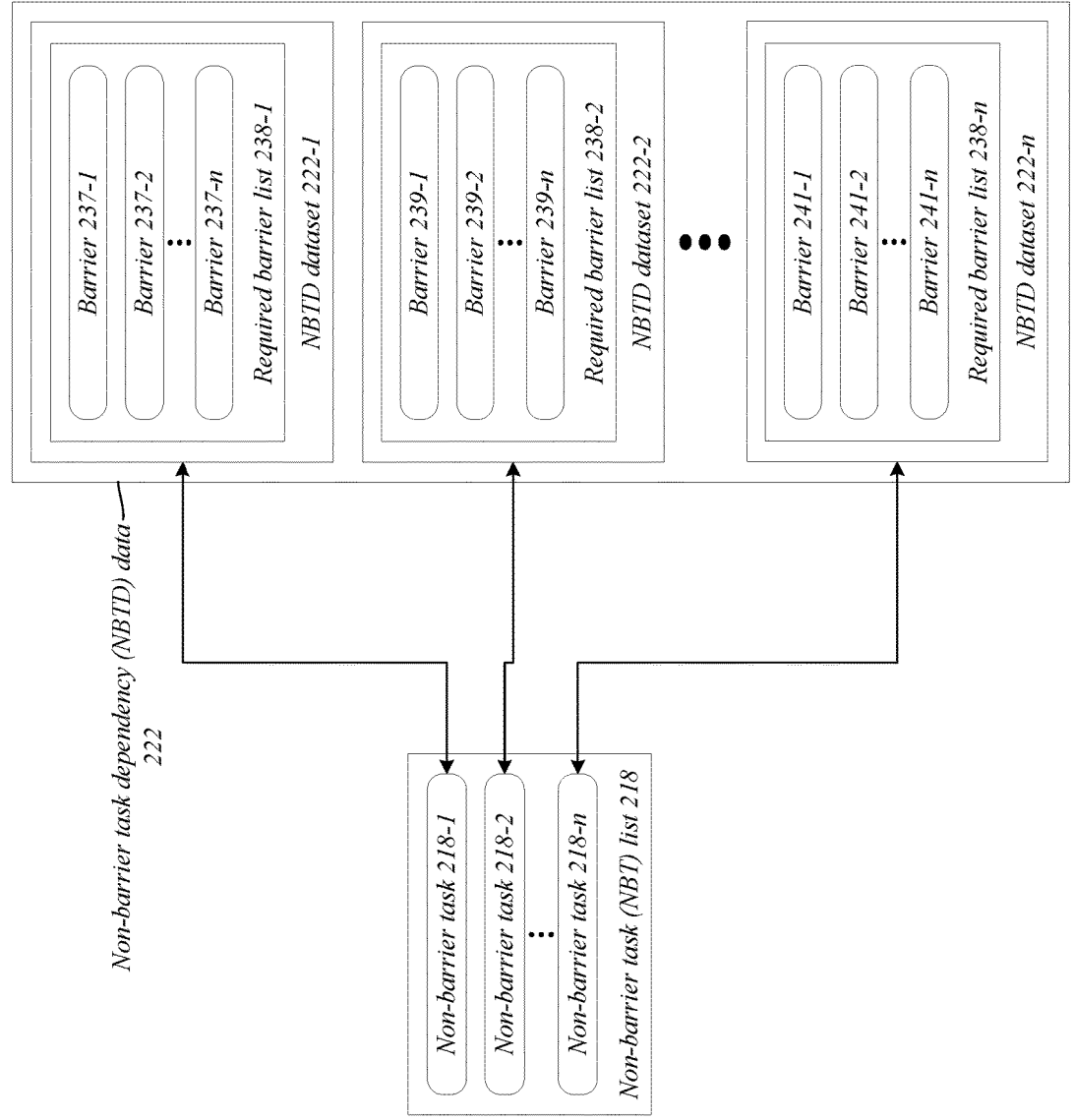

Referring to FIG. 2C, NBTD data 222 may include NBTD dataset 222-1 that corresponds to non-barrier task 218-1, NBTD dataset 222-2 that corresponds to non-barrier task 218-2, and NBTD dataset 222-n that corresponds to non-barrier task 218-n. NBTD dataset 222-1 may include a required barrier list 238-1 with barriers 237-1, 237-2, 237-n; NBTD dataset 222-2 may include a required barrier list 238-2 with barriers 239-1, 239-2, 239-n; and NBTD dataset 222-n may include a required barrier list 238-n with barriers 241-1, 241-2, 241-n. In many embodiments, required barriers may be the barriers that are either producers or consumers of a corresponding non-barrier task. In some embodiments, required barriers may be upstream or downstream dependencies of a corresponding non-barrier task.

Figure 2D:
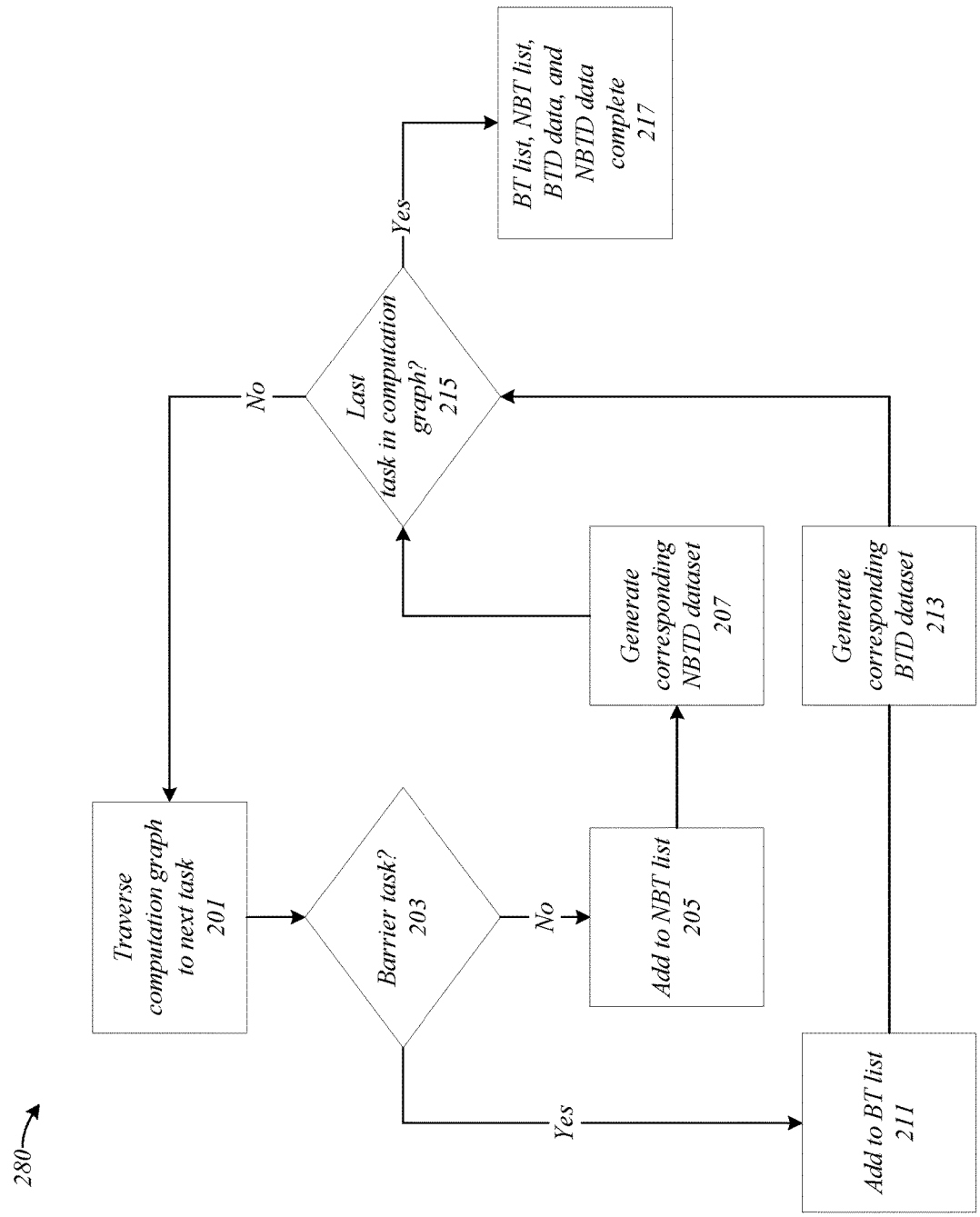

Referring to FIG. 2D, in various embodiments, the process flow 280 in environment 200D may provide an exemplary technique for determining one or more of the BT list, the NBT list, the BTD data, and, the NBTD data. In various embodiments, process flow 280 may comprise one or more portions of an exemplary technique for preparing to enter a recursive scheduling algorithm. In some embodiments, the process flow 280 in environment 200D may be implemented by graph analyzer 108. Process flow 280 may begin at block 201. At block 201 "traverse computation graph to next task" computation graph 102 may be traversed to the next task. Proceeding to block 203 "Barrier task?" it may be determined whether the next task is a barrier task. If the task is a barrier task, it may be added to the BT list at block 211 and the corresponding BTD dataset may be generated at block 213. If the task is not a barrier task, it may be added to the NBT list at block 205 and the corresponding NBTD dataset may be generated at block 207.

In either case, the process flow 280 may proceed to block 215. At block 215 "Last task in computation graph?" it may be determined whether the task is the last task in the computation graph. If it is not the last task, the process flow 280 may return to block 201 "traverse computation graph to next task". However, if it is the last task, the process flow 280 may proceed to block 217 "BT list, NBT list, BTD data, and NBTD data complete" where it is determined the BT list, NBT list, BTD data, and NBTD data are complete.

Figure 3B:
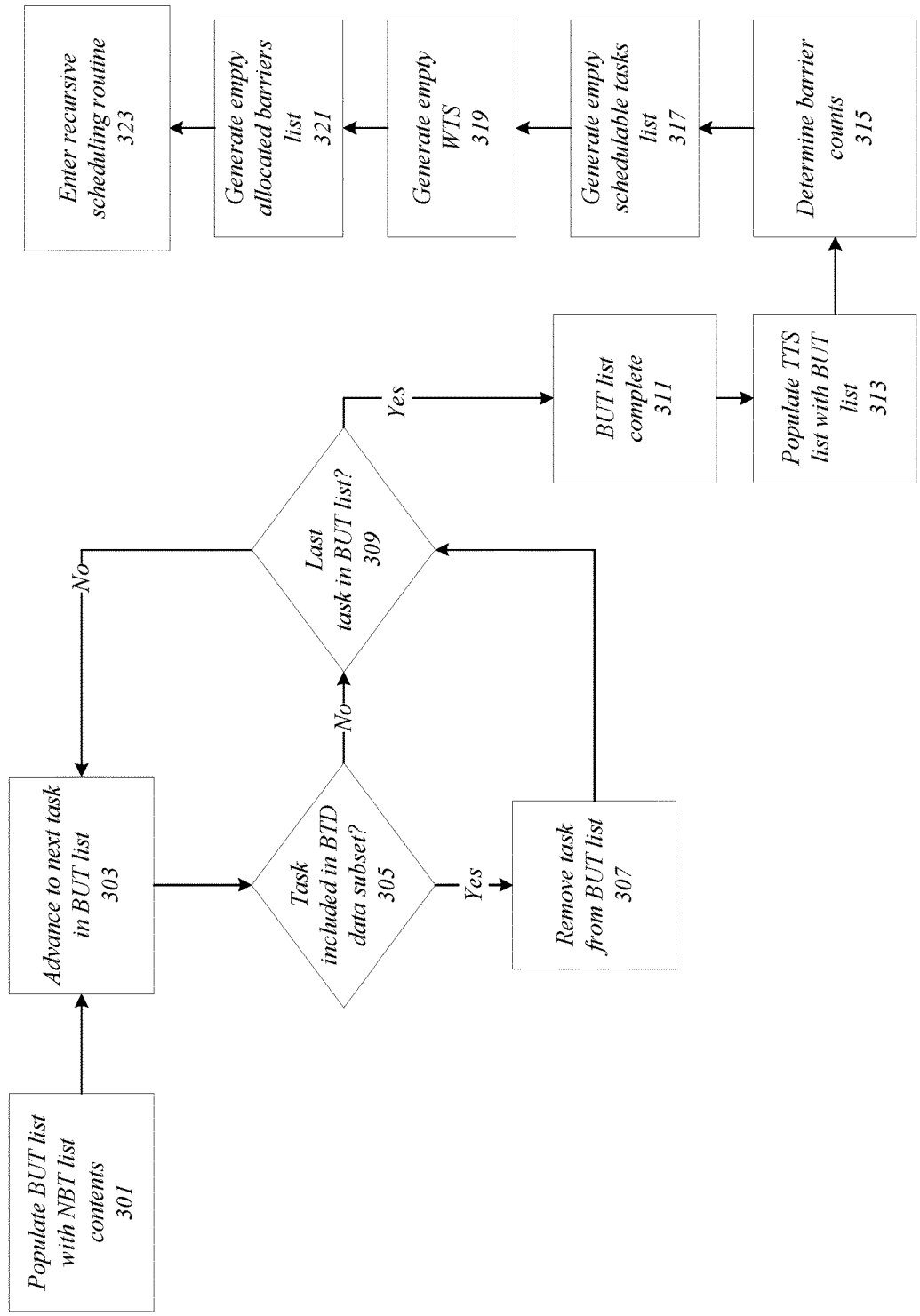

FIGS. 3A and 3B illustrate exemplary aspects of a list manager 110 in environments 300A, 300B according to one or more embodiments described herein. In environment 300A, list manager 110 may generate/determine/access/update one or more of barrierless upstream task (BUT) list 340, barrier counts 342, allocated barriers list 344, working task schedule (WTS) 346, schedulable tasks list 348, and TTS list 350 based, at least in part, on BTD data subset 220-A, BT list 216, and/or NBT list 218. In environment 300A, BTD data subset 220-A may include downstream lists 226-1, 226-2, 226-$n$, NBT list 218 may include NBTs 218-1, 218-2, 218-$n$, BUT list 340 may include BUTs 340-1, 340-2, 340-$n$, barrier counts 342 may include maximum barrier count 352 and allocated barrier count 354, allocated barriers list 344 may be an empty list 345, WTS 346 may be an empty schedule 347, schedulable tasks list 348 may be an empty list 349, and TTS list 350 may include TTSs 350-1, 350-2, 350-$n$. Embodiments are not limited in this context.

In various embodiments, the BTD data subset 220-A may include the consumers (e.g., barrier task downstream dependencies) of each barrier task. In one or more embodiments, BUT list 340 may comprise the remainder of the NBT list 218 after removing all NBTs that are not consumers of a barrier task. Initially, the TTS list 350 may be populated with the BUT list 340. The maximum barrier count 352 may indicate a maximum number of HW barriers that are available for performance of an execution schedule. Examples described herein, unless otherwise stated, adhere to a maximum barrier count 352 of two for simplicity and clarity. Similarly, exemplary computation graphs may include relatively few tasks for simplicity and clarity. However, the maximum barrier count 352 may be any positive integer, such as 8 or 64, and similarly, computation graphs may include any positive integer number of tasks.

The allocated barrier count 354 may indicate a number of HW barriers that would currently be being used during performance of the working task schedule (WTS) 346. The WTS may include a list in which the final execution list is built. Tasks may be added and/or removed from WTS 346 during generation of the execution schedule. For example, tasks may be removed from WTS 346 during backtracking due to a determination the current WTS will not allow all tasks to be scheduled without exceeding the maximum barrier count 352. In various embodiments, when all tasks are scheduled, the WTS 346 may be output as the execution schedule. The allocated barriers list 344 may indicate the HW barriers that would currently be being used during performance of the working task schedule (WTS) 346. The schedulable tasks list 348 may initially be an empty list 349 that is updated with tasks that can be scheduled.

Referring to FIG. 3B, in various embodiments, the process flow 380 in environment 300B may comprise one or more portions of an exemplary technique for preparing to enter a recursive scheduling algorithm. In some embodiments, the process flow 380 in environment 300B may be implemented by list manager 110. Process flow 380 may begin at block 301. At block 301 "populate BUT list with NBT list contents" the BUT list may be initially populated with the NBT list contents. Proceeding to block 303 "Advance to next task in the BUT list" the next task in the BUT list may be advanced to.

Continuing to block 305 "Task included in BTD data subset?" it may be determined whether the next task is included in the BTD data subset. In other words, it may be determined whether the task is a downstream dependency (e.g., consumer) of a barrier task. If the task is a consumer of a barrier task, it may be removed from the BUT list at block 307. However, if the task is not a consumer of a barrier task, it may be left on the BUT list.

In either case, the process flow 380 may proceed to block 309. At block 309 "Last task in BUT list?" it may be determined whether the task is the last task in the BUT list. If it is not the last task, the process flow 380 may return to block 303 "advance to next task in BUT list". However, if it is the last task, the process flow 380 may proceed to block 311 "BUT list complete" and determine the BUT list is complete. Continuing to block 313 "populate TTS list with BUT list" the TTS list may be initially populated with the BUT list. Proceeding to block 315 "determine barrier counts" the barrier counts may be determined. At block 317 "generate empty schedulable tasks list" an empty schedulable tasks list may be generated. At block 319 "generate empty WTS" an empty working task schedule may be generated. At block 321 "generate empty allocated barriers list" an empty allocated barriers list may be generated. Concluding at block 323 "enter recursive scheduling routine" the recursive scheduling routine may be entered.

Figure 4A:
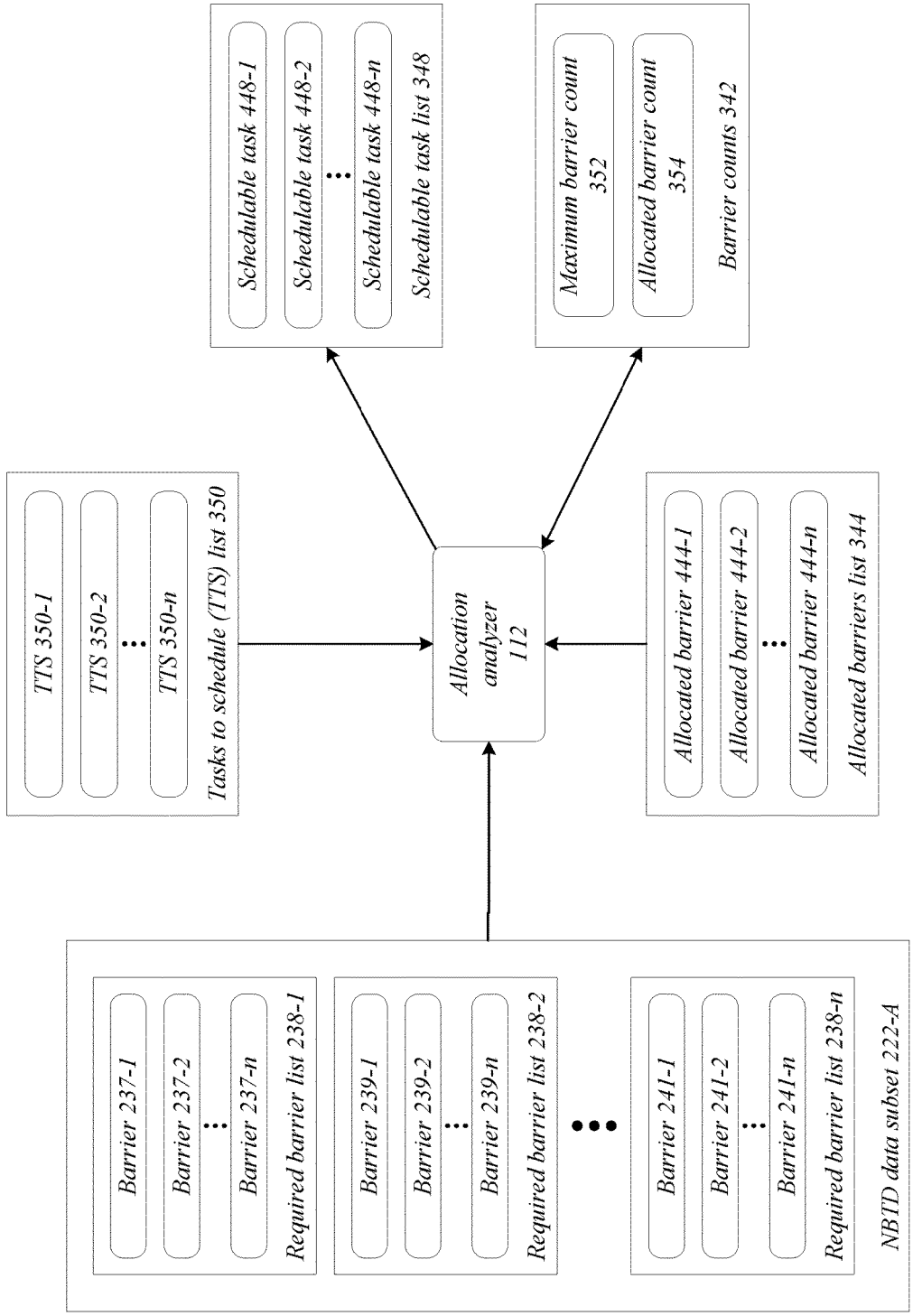
FIGS. 4A and 4B illustrate exemplary aspects of an allocation analyzer according to one or more embodiments described herein.
Figure 4B:
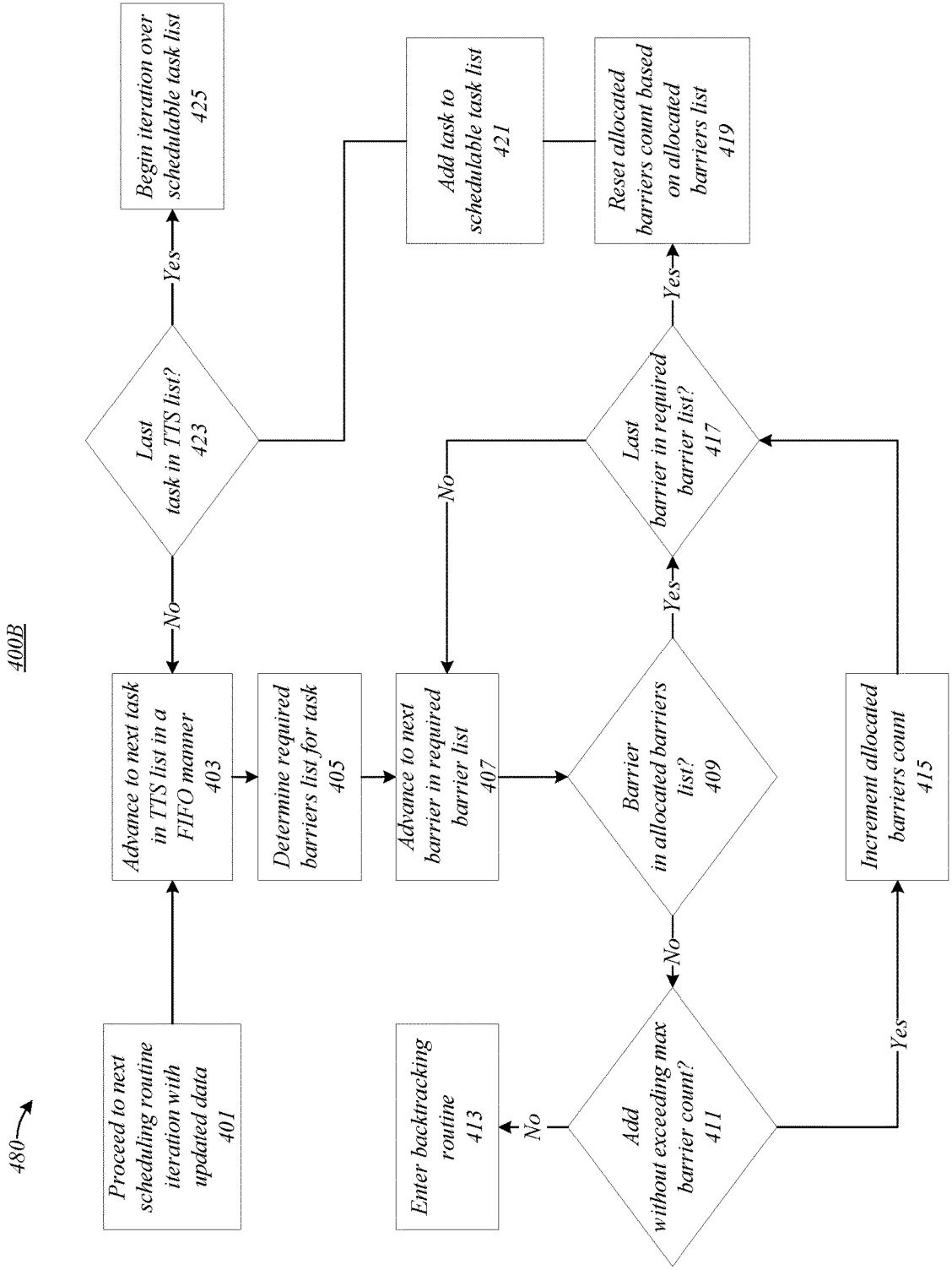

FIGS. 4A and 4B illustrate exemplary aspects of an allocation analyzer 112 in environments 400A, 400B according to one or more embodiments described herein. In environment 400A, allocation analyzer 112 may generate/determine/access/update one or more of schedulable task list 348 and barrier counts 342 based, at least in part, on TTS list 350, NBTD data subset 222-A, and/or allocated barriers list 344. In environment 400A, NBTD data subset 222-A may include required barrier lists 238-1, 238-2, 238-$n$, TTS list 350 may include TTS 350-1, 350-2, 350-$n$, allocated barriers list 344 may include allocated barriers 444-1, 444-2, 444-$n$, barrier counts 342 may include maximum barrier count 352 and allocated barrier count 354, and schedulable task list 348 includes schedulable tasks 448-1, 448-2, 448-$n$. In various embodiments, process flow 480 may illustrate at least a portion of a recursive scheduling routine. Embodiments are not limited in this context.

Referring to FIG. 4B, in various embodiments, the process flow 480 in environment 400B may comprise one or more portions of an exemplary recursive scheduling routine. In some embodiments, the process flow 480 in environment 400B may be implemented by allocation analyzer 112. Process flow 480 may begin at block 401. At block 401 "proceed to next scheduling routine iteration with updated data" the next scheduling routine iteration may be proceeded to with updated data. In some embodiments updated data may refer to any lists, schedules, or data that has changed, such as due to a previous iteration. Accordingly, in various embodiments, lists, schedules, and/or data may be accessed for each iteration.

At block 403 "advance to next task in TTS list in a FIFO manner" the next task in the TTS list may be advanced to in a FIFO manner. Proceeding to block 405 "determine required barriers list for task" the required barriers list for the task may be determined, such as based on NBTD data subset 222-A. Continuing to block 407 "advance to next barrier in required barrier list" the next barrier in the required barrier list may be advanced to. At block 409 "barrier in allocated barriers list?" it may be determined whether the barrier is included in the allocated barriers list. If the barrier is in the allocated barriers list, then process flow may proceed to block 417. However, if the barrier is not in the allocated barriers list, then process flow may proceed to block 411.

At block 411 "add without exceeding max barrier count?" it may be determined if the barrier not included in the allocated barriers list can be added to the WTS without exceeding the maximum barrier count 352. If it cannot be added without exceeding the maximum barrier count, then the backtracking routine may be entered at block 413 (see process flow 580B of FIG. 5C). However, if the barrier can be added without exceeding the maximum barrier count, then the allocated barriers count is incremented at block 415. At block 417 "last barrier in required barrier list?" if the barrier is not the last barrier in the required barrier list, the process flow 480 returns to block 407. However, if the barrier is the last barrier in the required barrier list, the process flow 480 proceeds to block 419.

At block 419 "reset allocated barriers count based on allocated barriers list" the allocated barriers count may be reset based on the allocated barriers list. Continuing to block 421 "add task to schedulable task list" the task may be added to the schedulable task list. At block 423 "last task in TTS list?" it may be determined whether the last is the last task in the TTS list. If the task is not the last task in the TTS list, then the process flow 480 may return to block 403. However, if the task is the last task in the TTS list, then the process flow 480 may proceed to block 425 "begin iteration over schedulable task list".

Figure 5A:
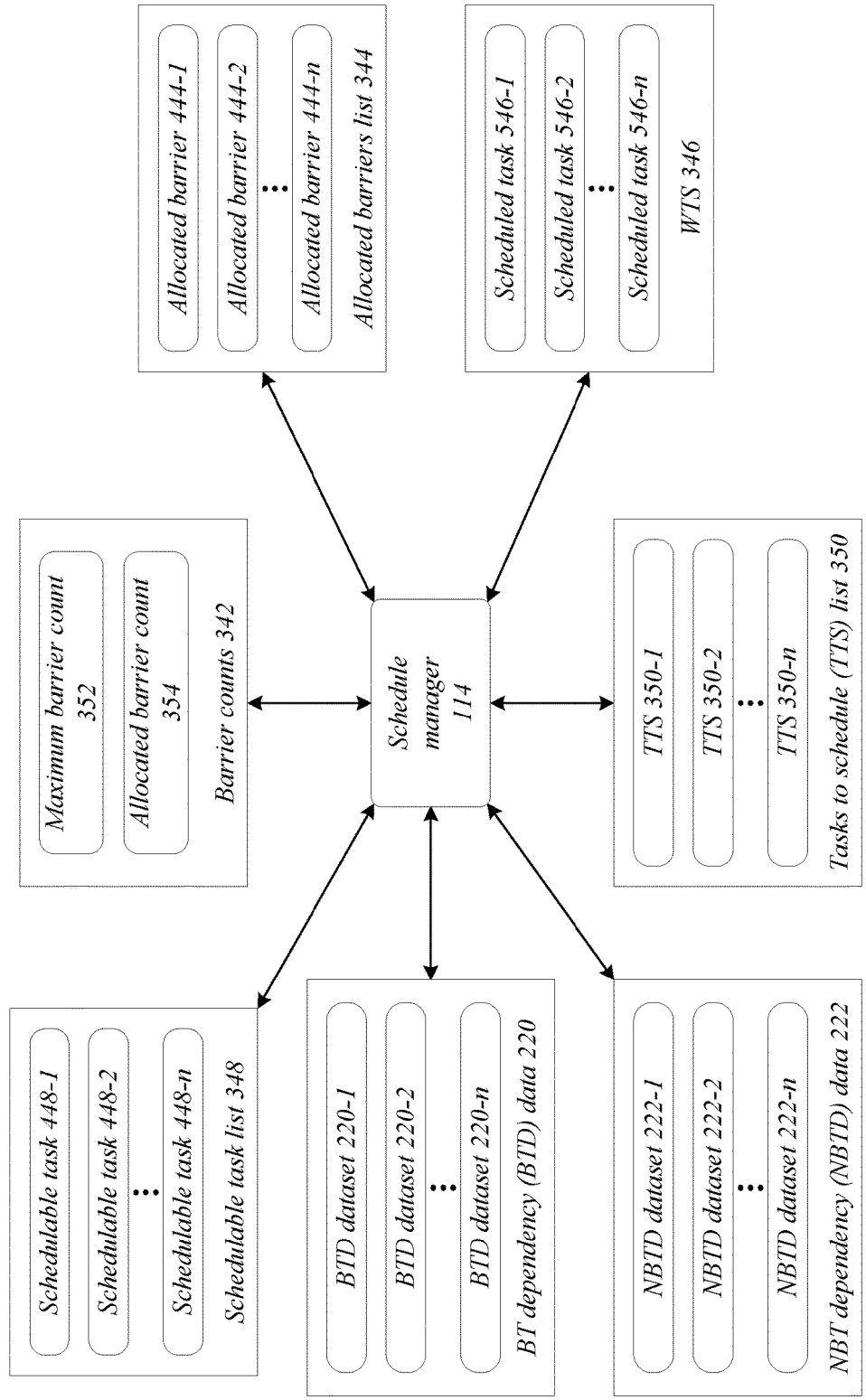
FIGS. 5A-5C illustrate exemplary aspects of a schedule manager according to one or more embodiments described here.
Figure 5B:
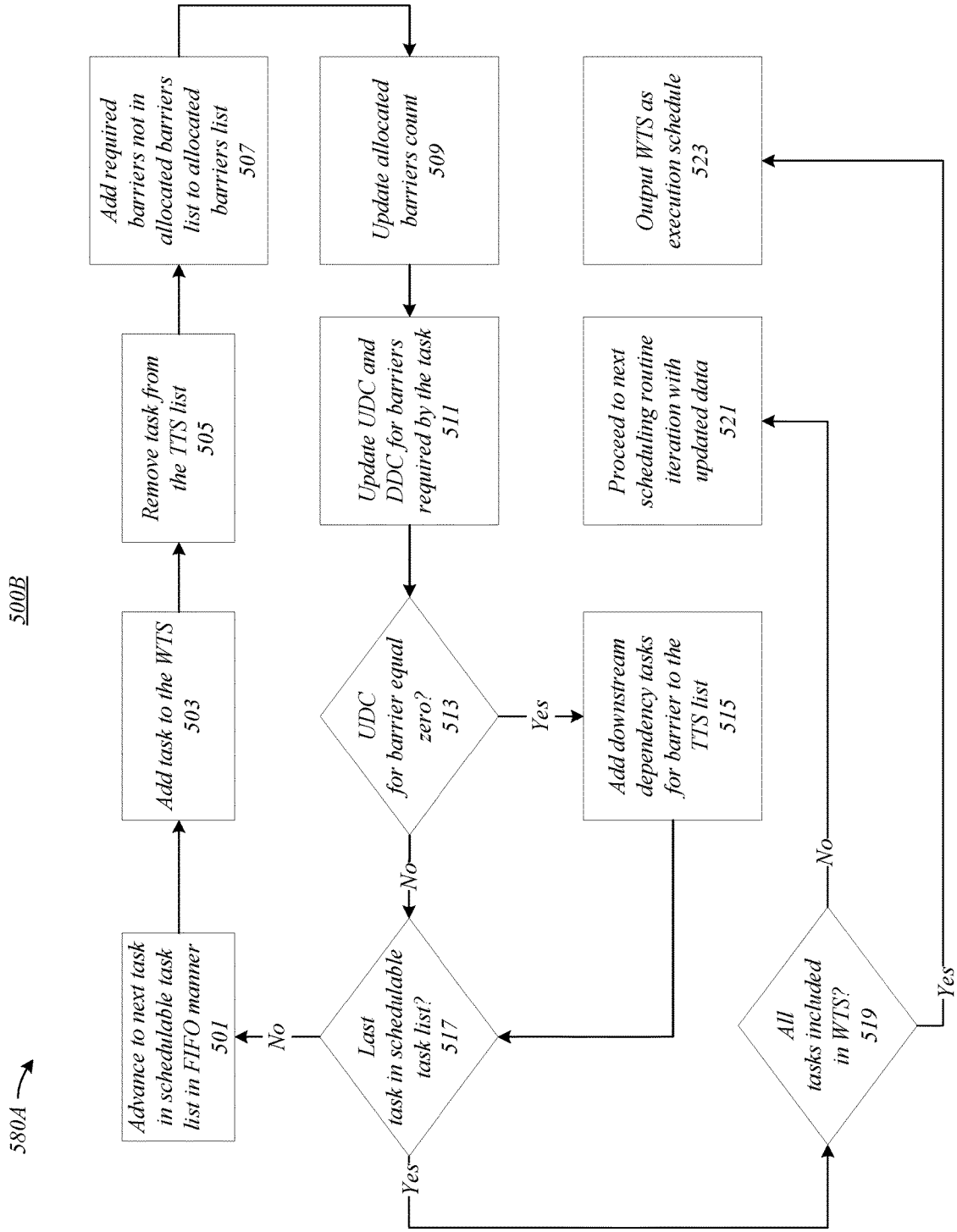
Figure 5C:
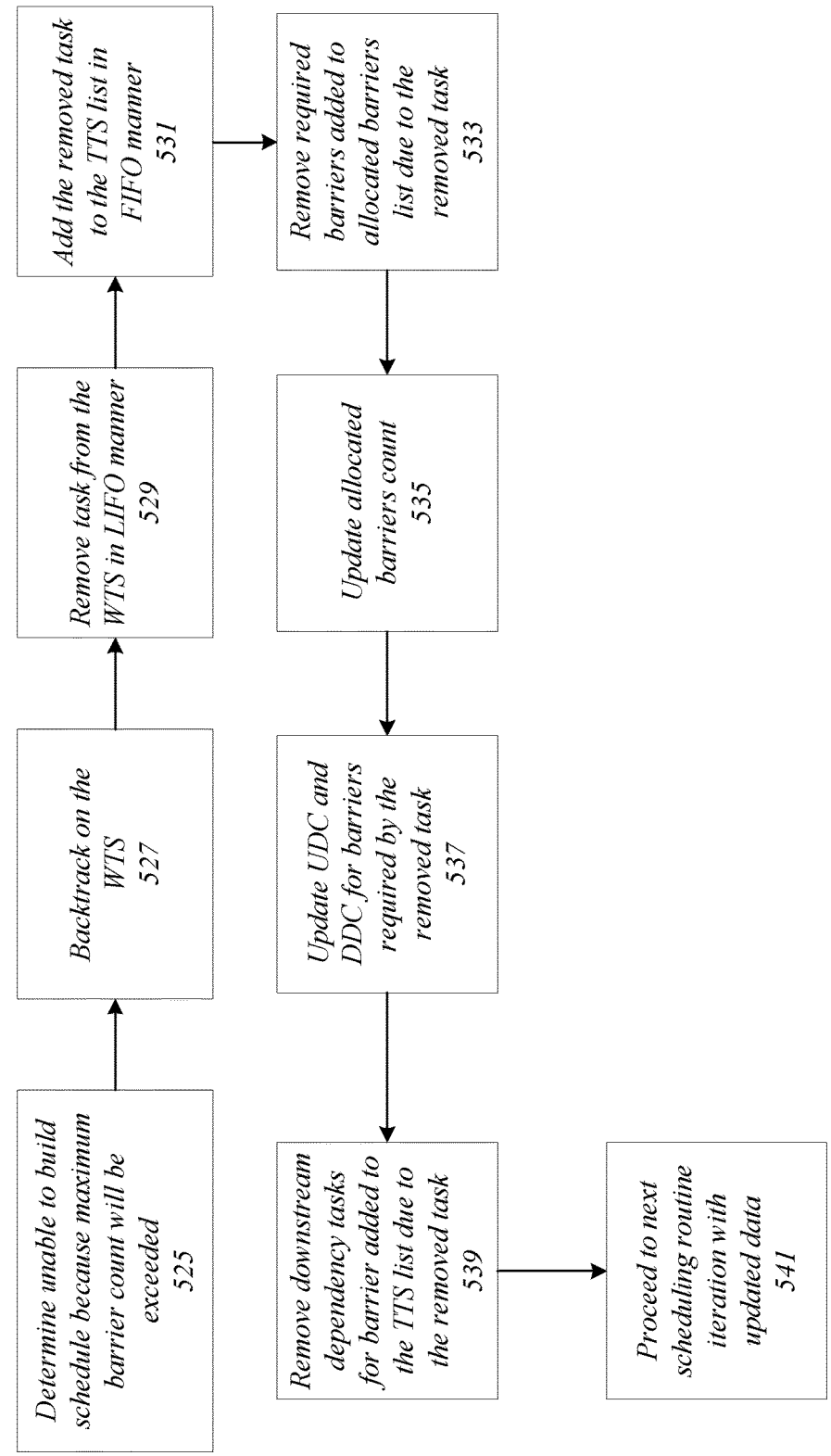

FIGS. 5A-5C illustrate exemplary aspects of a schedule manager 114 in environments 500A, 500B, 500C according to one or more embodiments described herein. In environment 500A, allocation analyzer 112 may generate/determine/access/update one or more of schedulable task list 348, barrier counts 342, TTS list 350, allocated barriers list 344, and WTS 346 based, at least in part, on one or more of BTD data 220, NBTD data 222, schedulable task list 348, barrier counts 342, TTS list 350, allocated barriers list 344, and WTS 346. In environment 500A, WTS 346 may include scheduled tasks 546-1, 546-2, 546-n in addition to previously described components. In various embodiments, process flows 580A, 580B may illustrate at least a portion of a recursive scheduling routine. In various such embodiments, process flow 580B may illustrate at least a portion of a backtracking algorithm. Embodiments are not limited in this context.

Referring to FIG. 5B, in various embodiments, the process flow 580A in environment 500B may comprise one or more portions of an exemplary recursive scheduling routine. In some embodiments, the process flow 580A in environment 500B may be implemented by schedule manager 114. Process flow 580A may begin at block 501. At block 501 "advance to next task in schedulable task list in FIFO manner" the next task in the schedulable task list may be advanced to in a FIFO manner. At block 503 "add task to the WTS" the task may be added to the WTS. Continuing to block 505 "remove task from the TTS list" the task may be removed from the TTS list. Proceeding to block 507 "add required barriers not in allocated barriers list to allocated barriers list" the required barriers for the task added to the WTS that are not in the allocated barriers list may be added to the allocated barriers list.

At block 509 "update allocated barriers count" the allocated barriers count may be updated. Continuing to block 511 "update UDC and DDC for barriers required by the task" the upstream dependency count (e.g., numProducers) and the downstream dependency count (e.g., numConsumers) may be updated for the barriers required by the task. At block 513 it may be determined whether the UDC for a barrier equals zero. If the UDC for a barrier equals zero, the downstream dependency tasks for the barrier may be added to the TTS list at block 515.

At block 517 it may be determined whether the task is the last task in the schedulable task list. If it is not, process flow 580A may return to block 501. However, if the task is the last task in the schedulable task list, the process flow 580A may proceed to block 519. At block 519, it may be determined if all tasks are included in the WTS. If all tasks are included in the WTS, then the WTS may be output as the execution schedule at block 523. However, if all tasks are not included in the WTS, the next scheduling routine iteration may be proceeded to with updated data at block 521.

Referring to FIG. 5C, in various embodiments, the process flow 580B in environment 500C may comprise one or more portions of an exemplary recursive scheduling routine, such as a backtracking portion. In some embodiments, the process flow 580B in environment 500C may be implemented by schedule manager 114. Process flow 580B may begin at block 525. At block 525 it may be determined that the schedule is unable to be built because the maximum barrier count will be exceeded. Proceeding to block 527 the WTS may be backtracked on. Continuing to block 529, a task from the WTS may be removed in a last in first out (LIFO) manner.

At block 531, the removed task may be added to the TTS list, such as in a FIFO manner. Continuing to block 533, the required barriers added to the allocated barriers list due to the removed task may be removed from the allocated barriers list. Proceeding to block 535, the allocated barriers count may be updated. Next, the UDC and DDC for barriers required by the removed task may be updated at block 537. At block 539, the downstream dependency tasks for the barrier added to the TTS list due to the removed task may be removed from the TTS list. Finally, the process flow 580B may proceed to the next scheduling routine iteration with the updated data at block 541.

Figure 13:
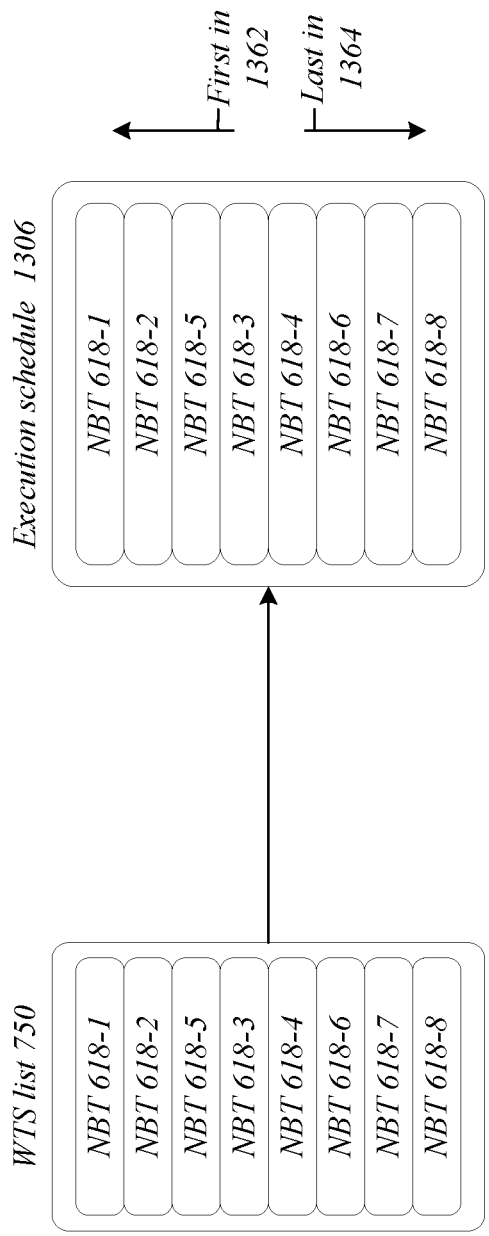
FIG. 13 illustrates exemplary eighth aspects of generating an execution schedule based on a computation graph according to one or more embodiments described herein.
Figure 14A:
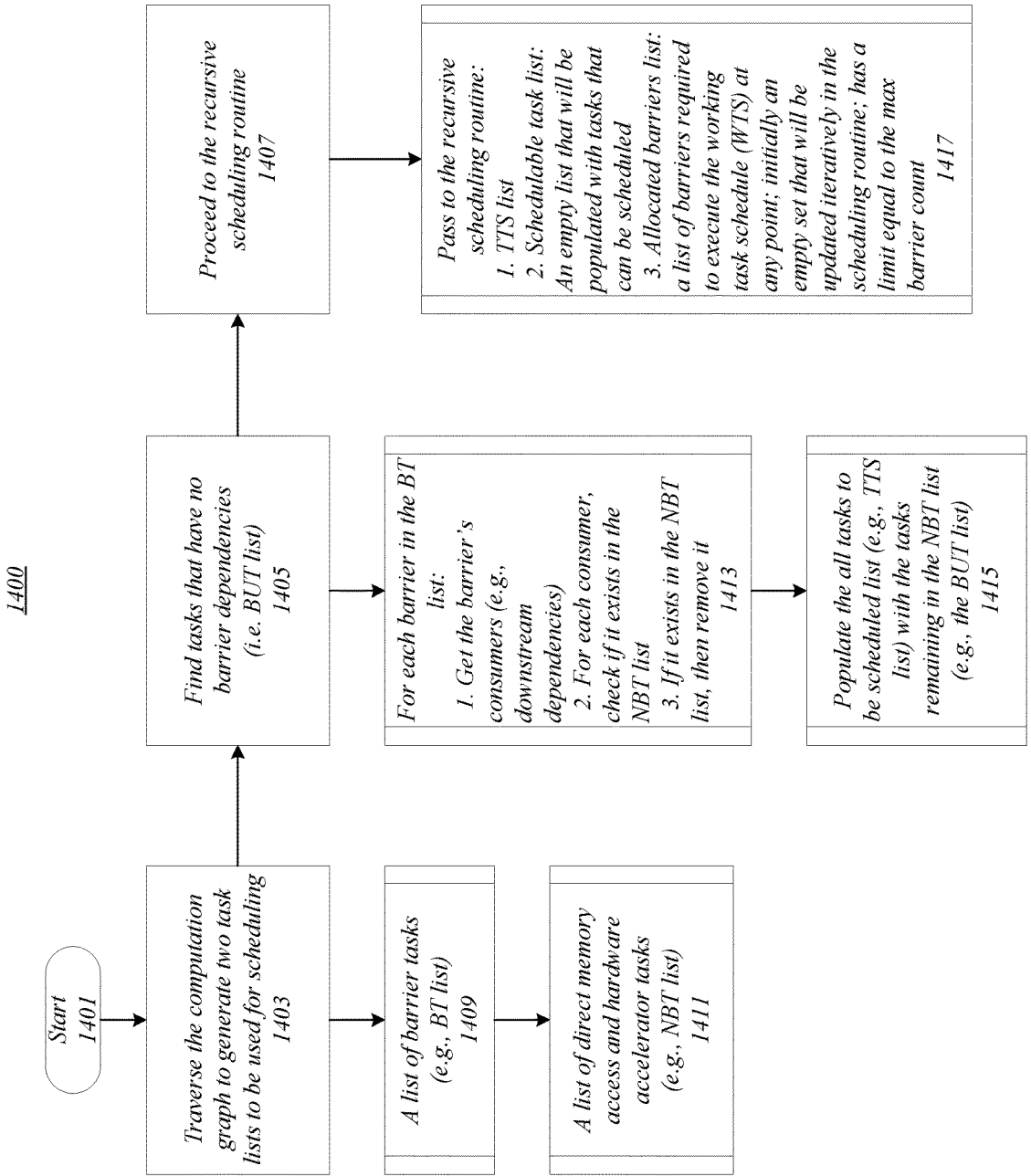
FIGS. 14A-14C illustrate an exemplary process flow according to one or more embodiments described herein.
Figure 14B:
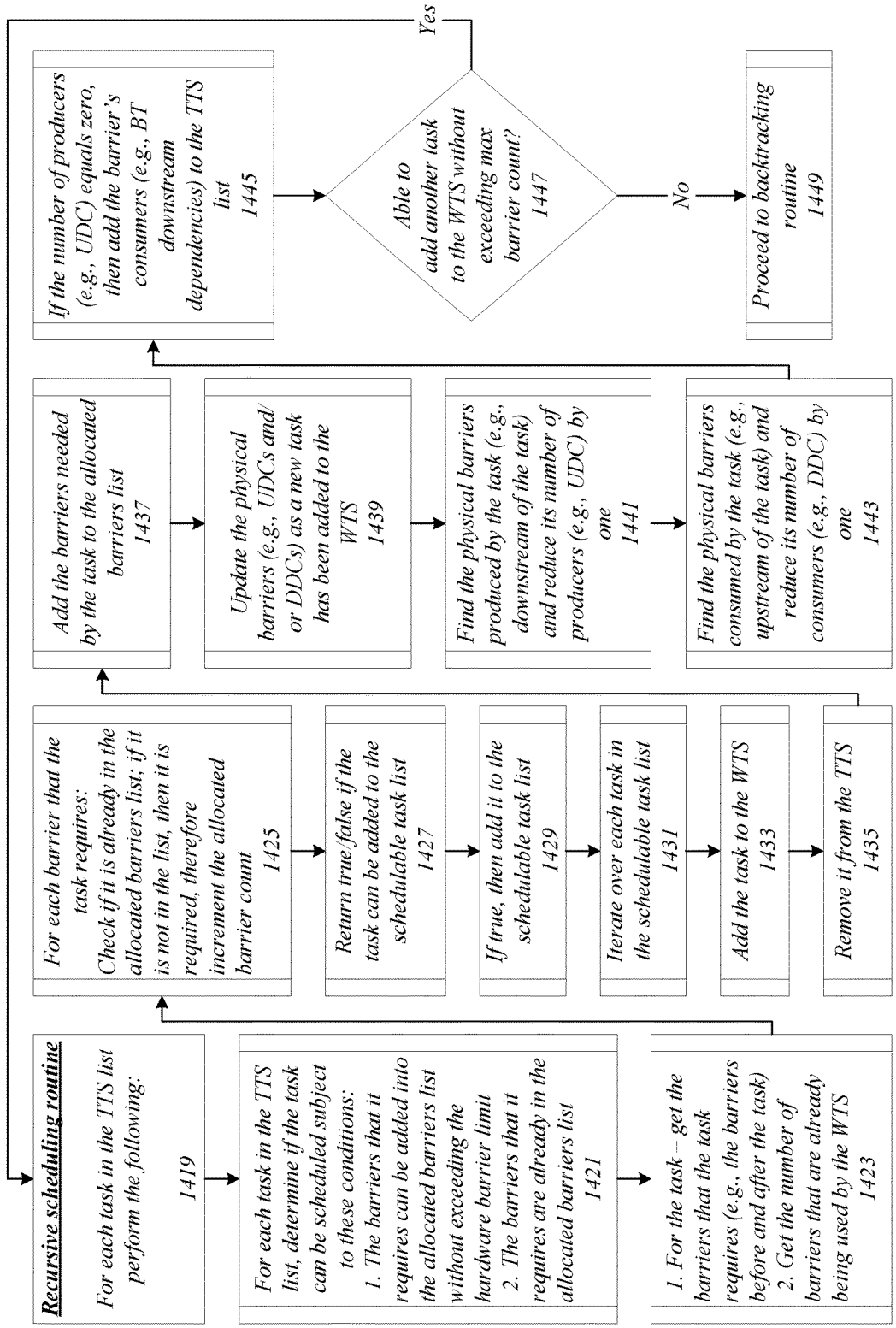
Figure 14C:
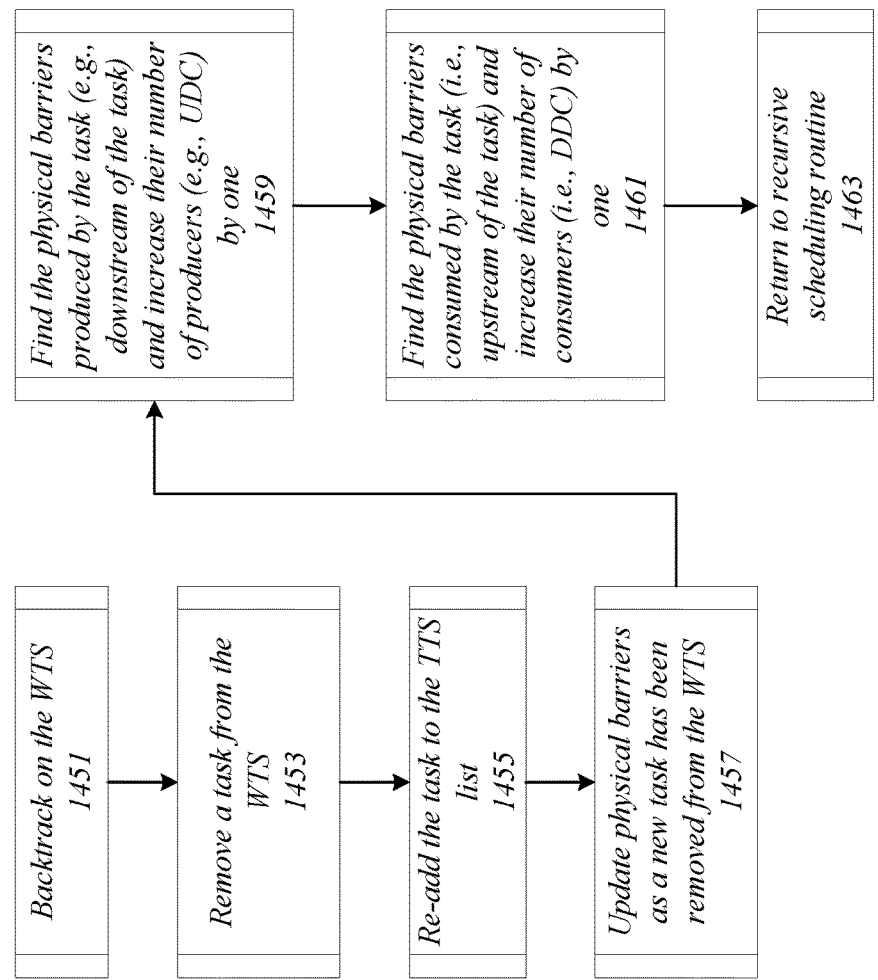

FIGS. 6-14C illustrate exemplary aspects of a scheduling algorithm according to one or more embodiments described herein. Further, FIGS. 6-13 step through aspects of a backtracking scheduling algorithm illustrated in process flow 1400 of FIGS. 14A-14C while demonstrating how data, such as lists, schedules, computation graphs, and/or barrier tasks, is manipulated to arrive at the final execution schedule 1306 based on computation graph 602. Specifically, the process flow 1400 of FIGS. 14A-14C includes a flow diagram of the backtracking scheduling algorithm; FIG. 6 illustrates a computation graph 602 that may be used for generating an execution schedule, such as according to process flow 1400; FIGS. 7A and 7B illustrate through the first iteration of the scheduling algorithm; FIGS. 8A and 8B illustrate through the second iteration of the scheduling algorithm; FIGS. 9A and 9B illustrate through the third iteration of the scheduling algorithm; FIGS. 10A and 10B illustrate through the fourth iteration of the scheduling algorithm; FIGS. 11A and 11B illustrate through two iterations of the backtracking portion of the algorithm; FIGS. 12A and 12B illustrate a first iteration of the scheduling algorithm after two iterations of backtracking have been completed; and FIG. 13 illustrates the final FIFO task schedule upon completion of the scheduling algorithm. Note: in FIGS. 8A and 8B NBT 618-3 is added to WTS 746 before NBT 618-2 to illustrate how exceeding the maximum barrier count is handled. However, during normal operation NBT 618-2 would be added to WTS 746 before NBT 618-3. Embodiments are not limited in this context.

The computation graph 602 illustrated in environment 600 of FIG. 6 includes input 601, NBTs 618-1, 618-2, 618-3, 618-4, 618-5, 618-6, 618-7, 618-8 (or NBTs 618), BTs 616-1, 616-2, 616-3 (or BTs 616), and output 699. Additionally, BT 616-1 may include UDC 628-1 and DDC 630-1, BT 616-2 may include UDC 628-2 and DDC 630-2, and BT 616-3 may include UDC 628-3 and DDC 630-3. As shown in FIG. 6, initially, UDC 628-1 may equal two (corresponding to NBTs 618-1, 618-2), DDC 630-1 may equal one (corresponding to NBT 618-5), UDC 628-2 may equal two (corresponding to NBTs 618-3, 618-4), DDC 630-2 may equal one (corresponding to NBT 618-6), UDC 628-3 may equal two (corresponding to NBTs 618-5, 618-6), and DDC 630-3 may equal one (corresponding to NBT 618-7). DDC 630-3 may not equal two based on computation graph 602 because NBT 618-8 is not a direct dependency of BT 616-3. In various embodiments, input 601 may comprise data provided for classification according to the computation graph 602 and output 699 may comprise the classification produced according to the computation graph 602.

Environments 700A, 800A, 900A, 1000A, 1100A, 1200A of FIGS. 7A, 8A, 9A, 10A, 11A, 12A illustrate updates/changes to lists and schedules (e.g., TTS list 750, schedulable task list 748, WTS 746, allocated barriers list 744) while performing various portions of the scheduling algorithm to produce execution schedule 1306 in environment 1300 of FIG. 13. Further, environments 700B, 800B, 900B, 1000B, 1100B, 1200B of FIGS. 7B, 8B, 9B, 10B, 11B, 12B illustrate updates/changes to computation graph 602 while performing corresponding portions of the scheduling algorithm to produce execution schedule 1306 of FIG. 13 (e.g., 700A corresponds to 700B, 800A corresponds to 800B, etcetera). Generally, in FIGS. 7A-13 lists are illustrated with the first in towards the top of the page and the last in towards the bottom of the page. Accordingly, in the TTS list 750 of FIG. 7A, NBT 618-1 may be the first in 762 and NBT 618-8 may be the last in 764. Similarly, in the execution schedule 1306 of FIG. 13, NBT 618-1 may be the first in 1362 and NBT 618-8 may be the last in 1364.

Figure 7A:
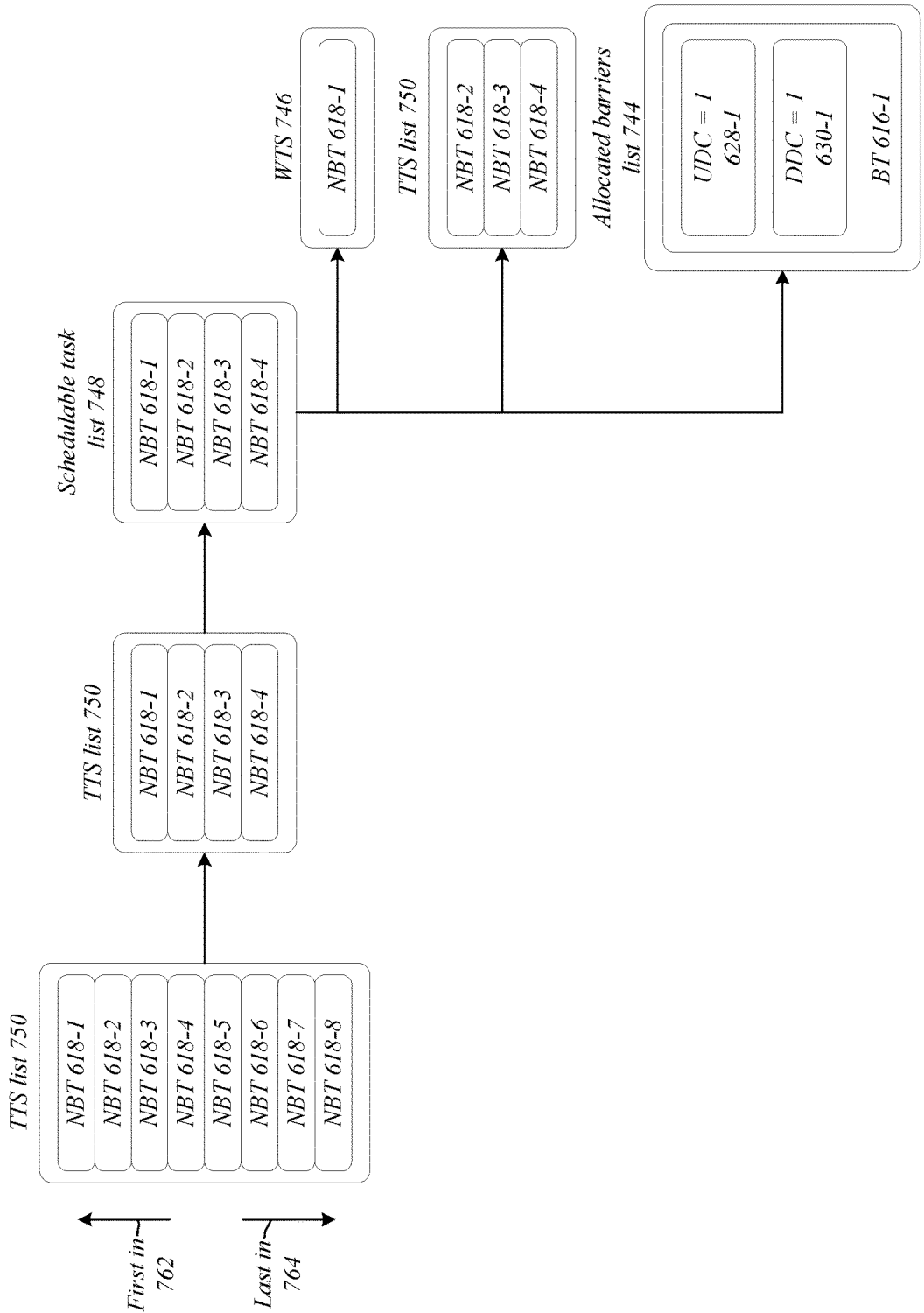
FIGS. 7A-7B illustrate exemplary second aspects of generating an execution schedule based on a computation graph according to one or more embodiments described herein.
Figure 7B:
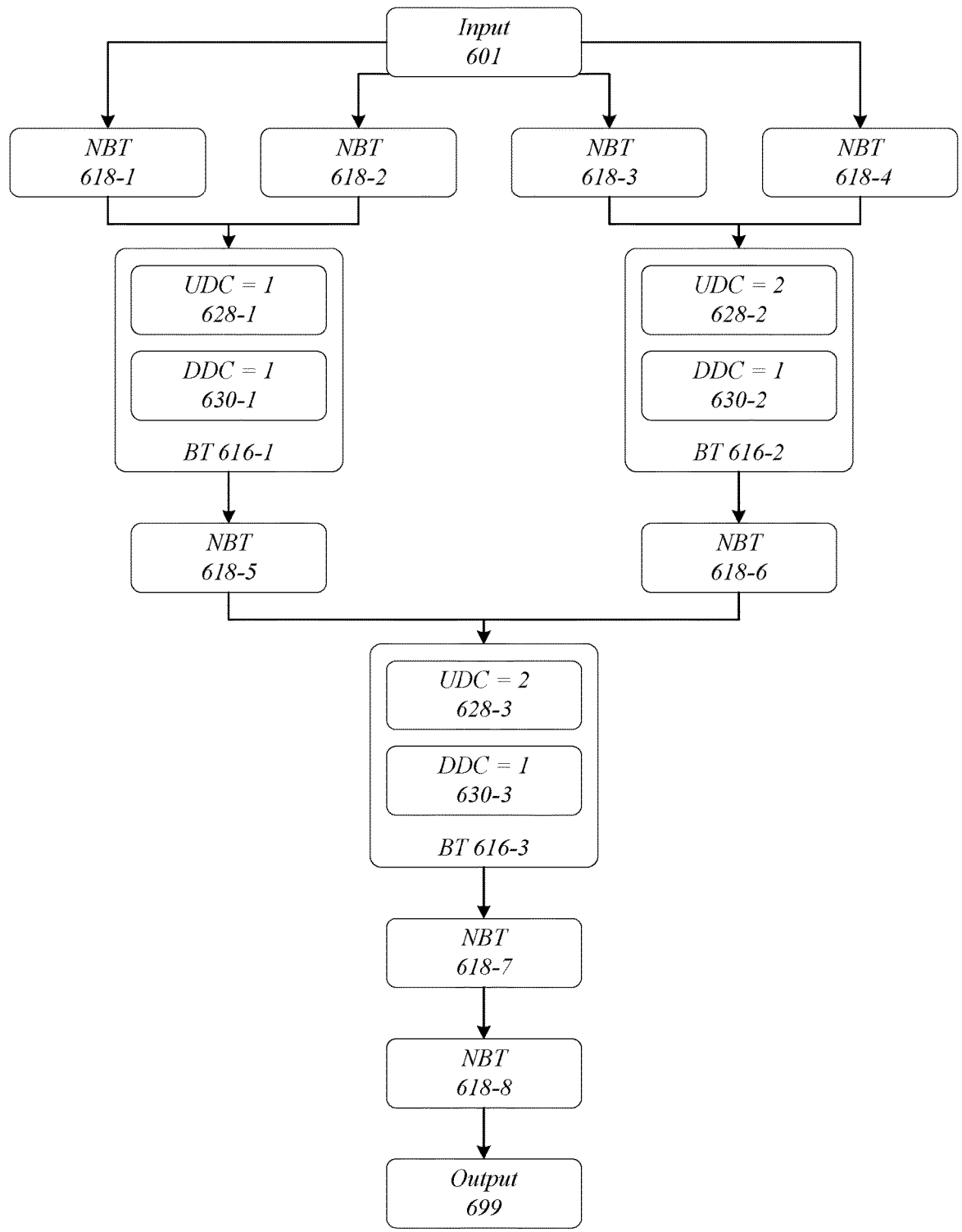
Figure 8A:
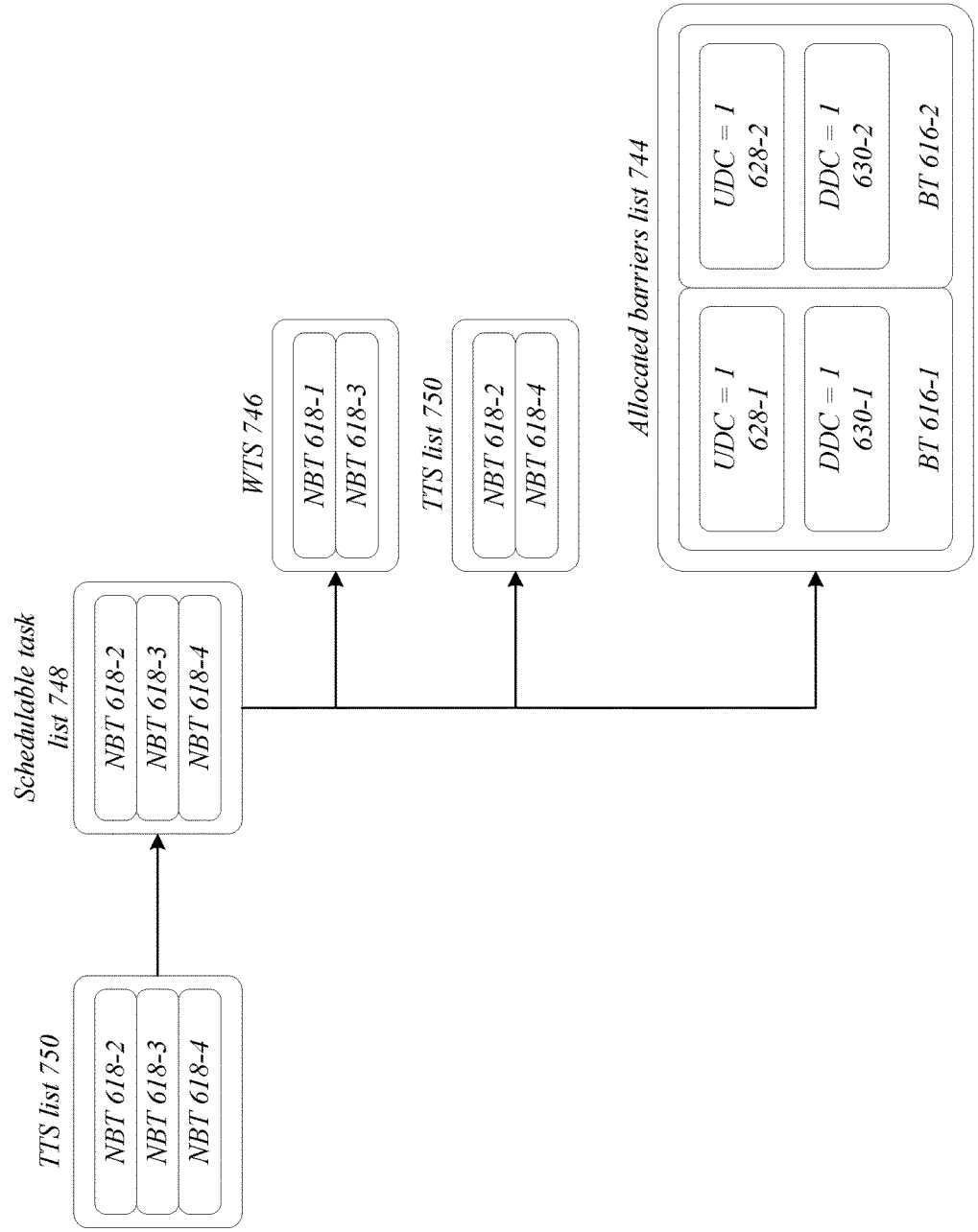
FIGS. 8A-8B illustrate exemplary third aspects of generating an execution schedule based on a computation graph according to one or more embodiments described herein.
Figure 8B:
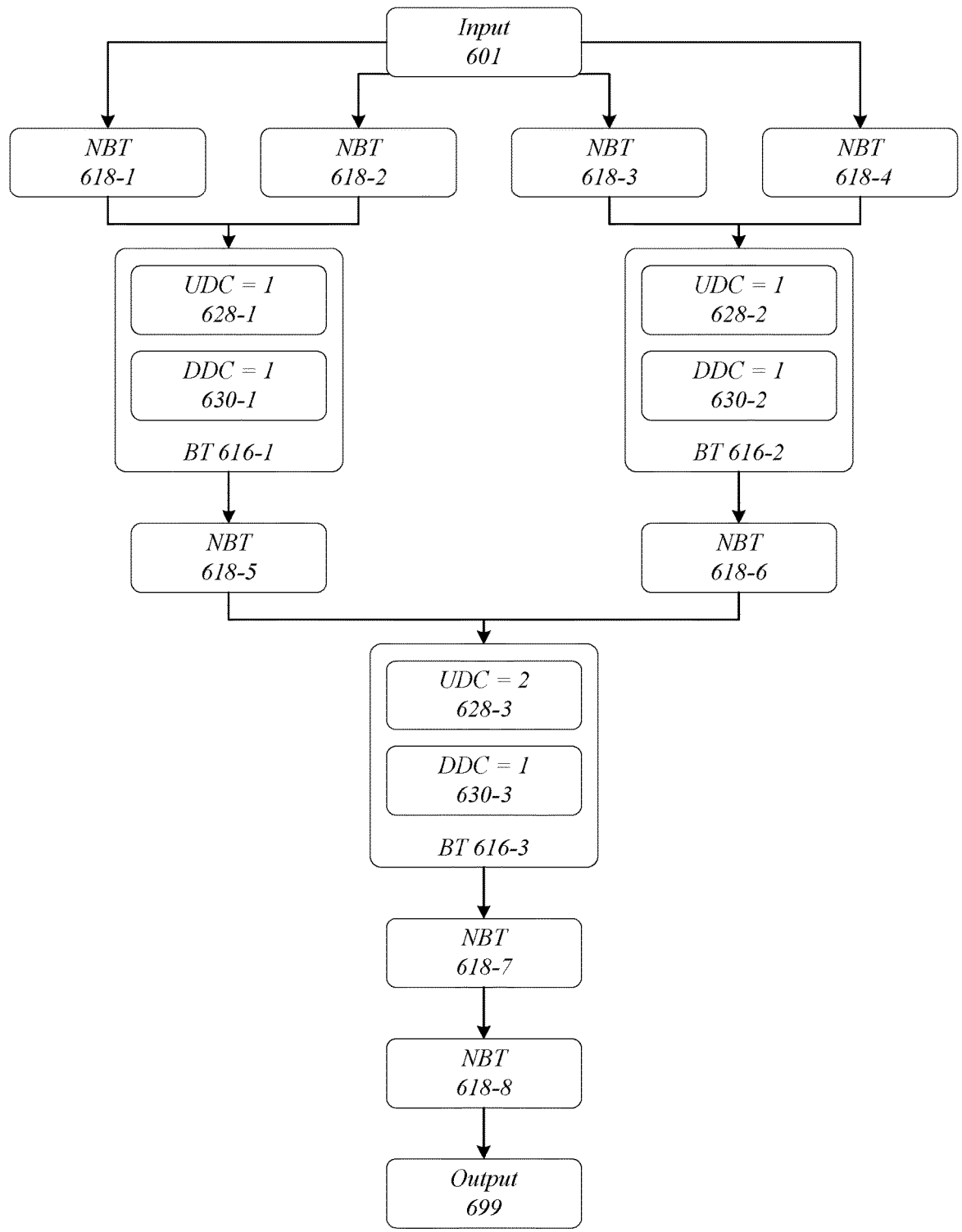
Figure 9B:
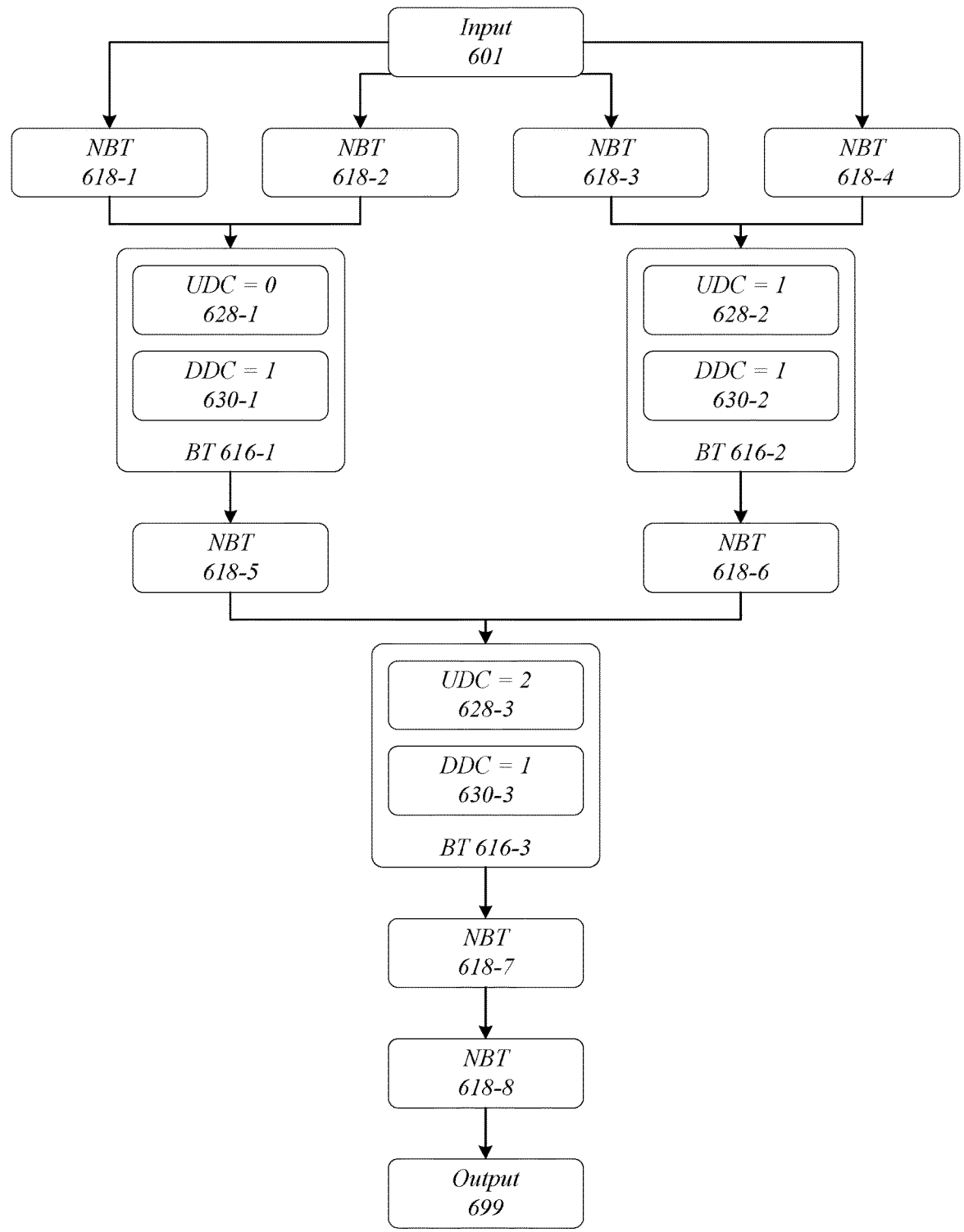
Figure 10A:
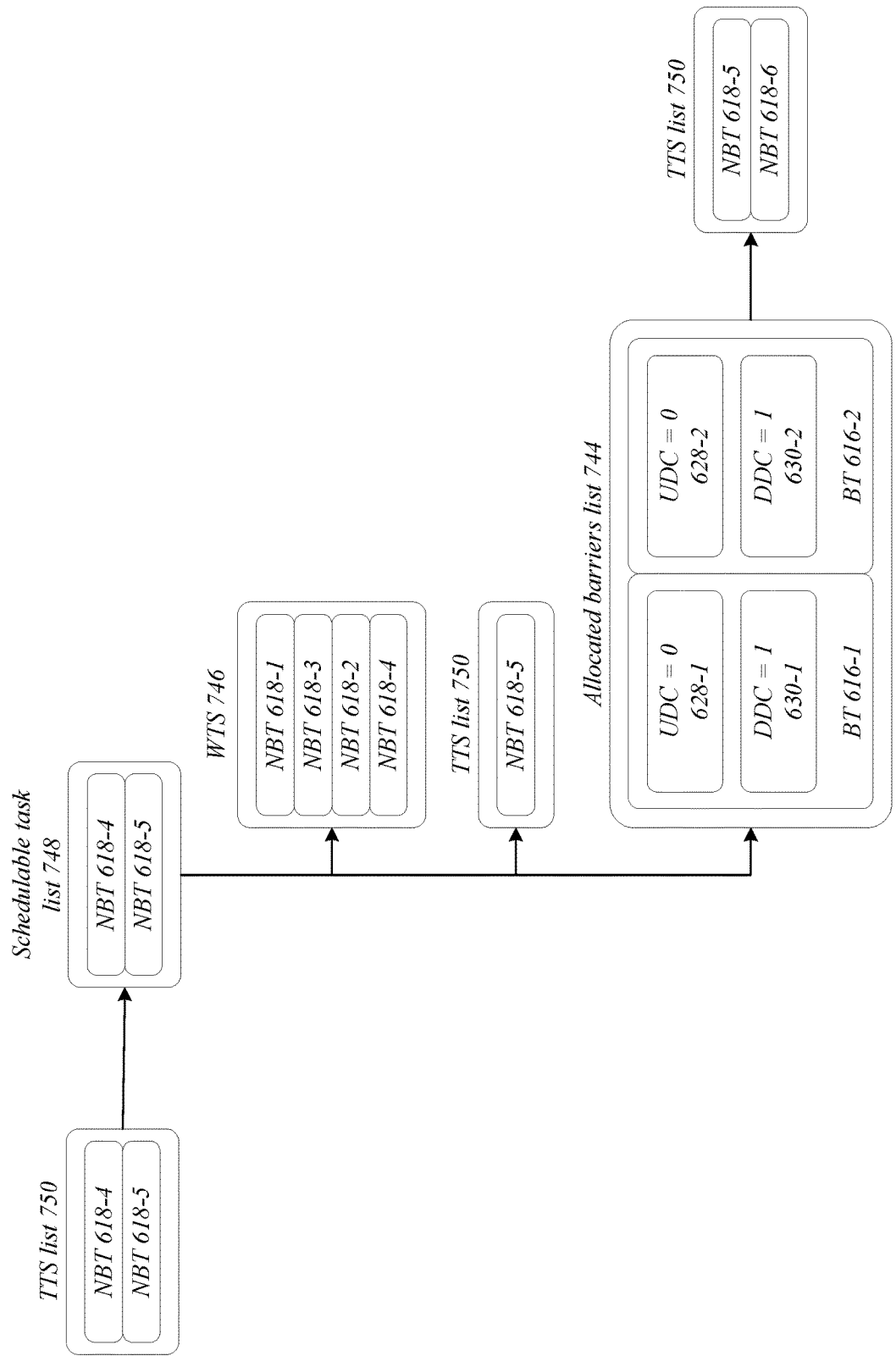
FIGS. 10A-10B illustrate exemplary fifth aspects of generating an execution schedule based on a computation graph according to one or more embodiments described herein.
Figure 10B:
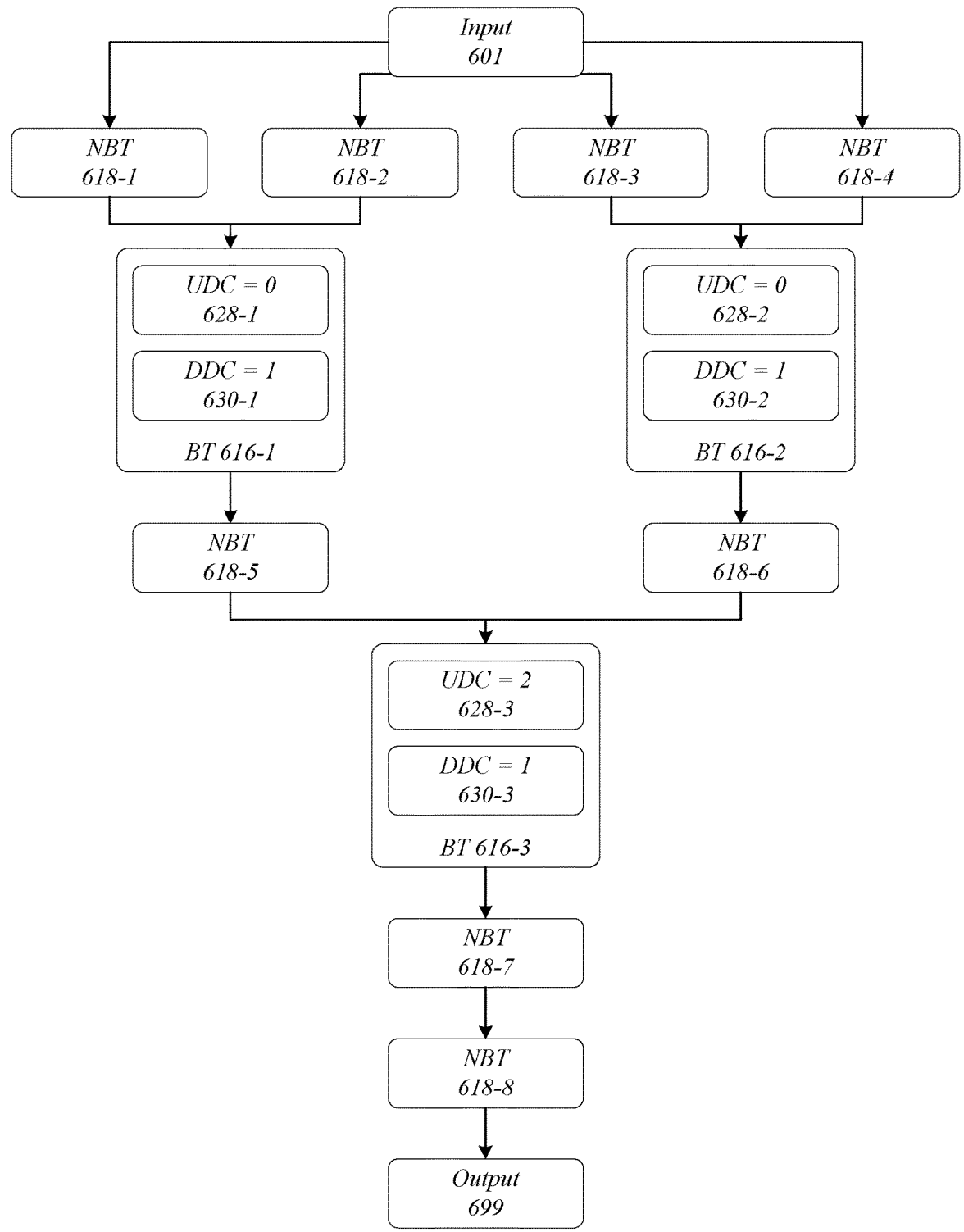
Figure 11A:
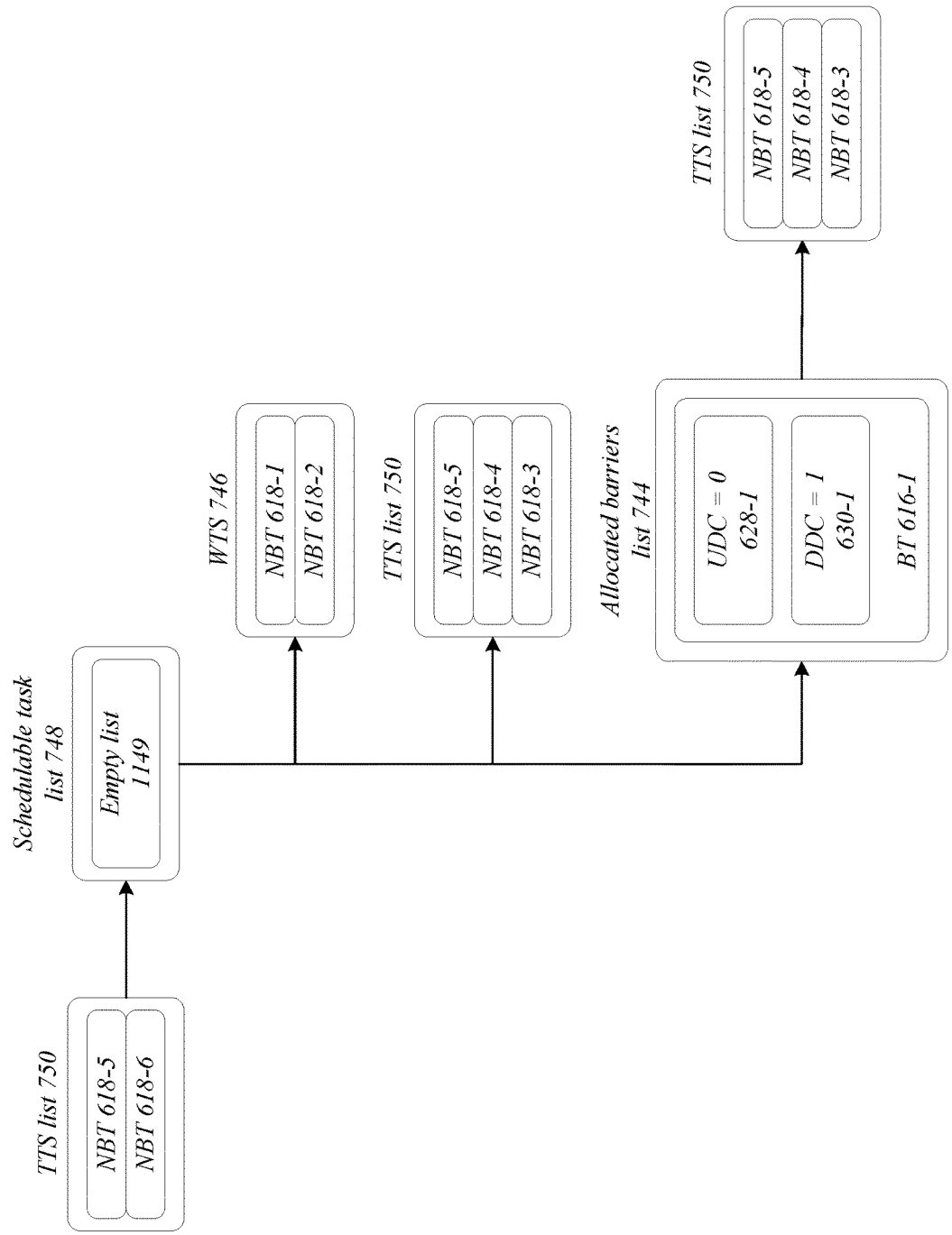
FIGS. 11A-11B illustrate exemplary sixth aspects of generating an execution schedule based on a computation graph according to one or more embodiments described herein.
Figure 11B:
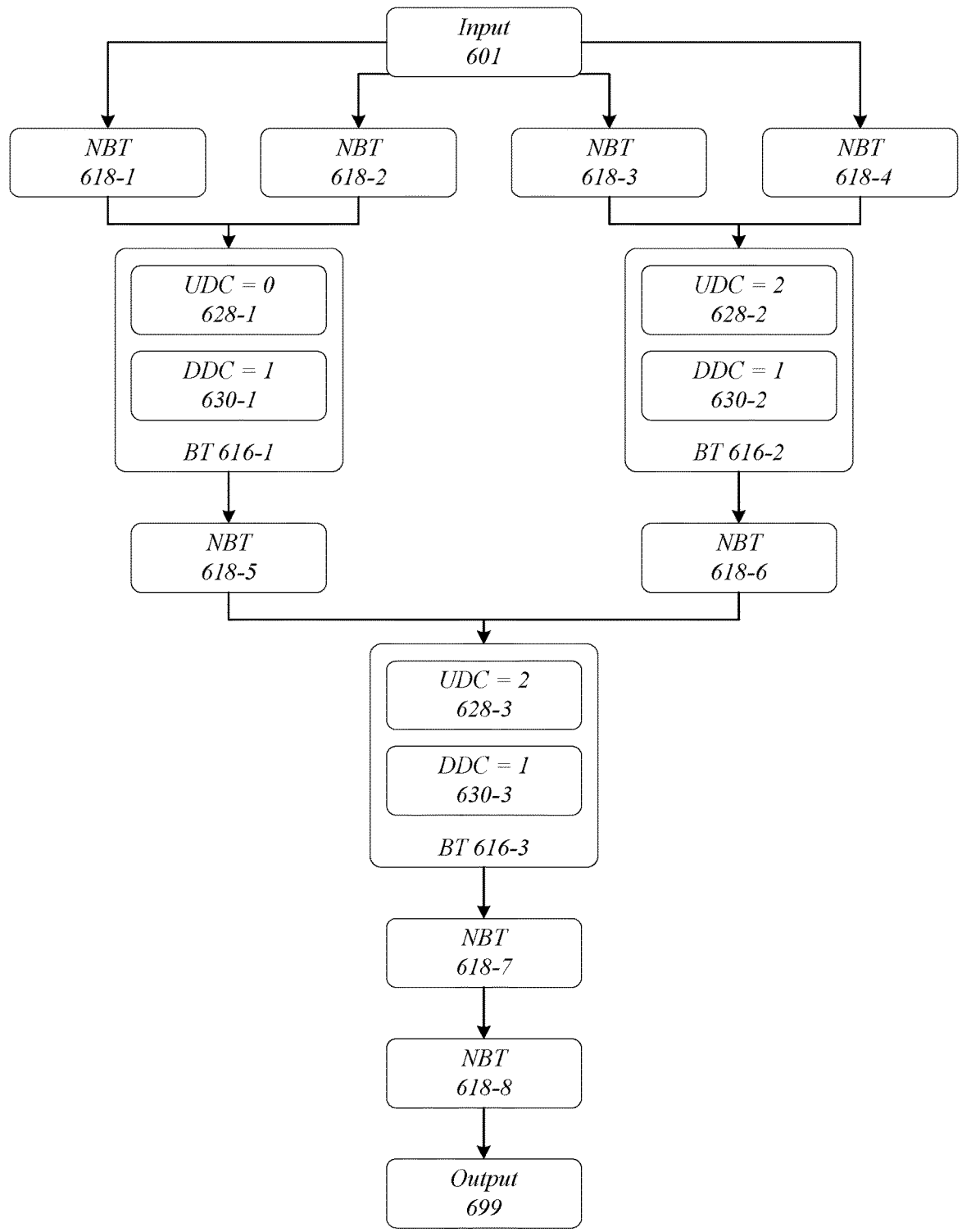
Figure 12A:
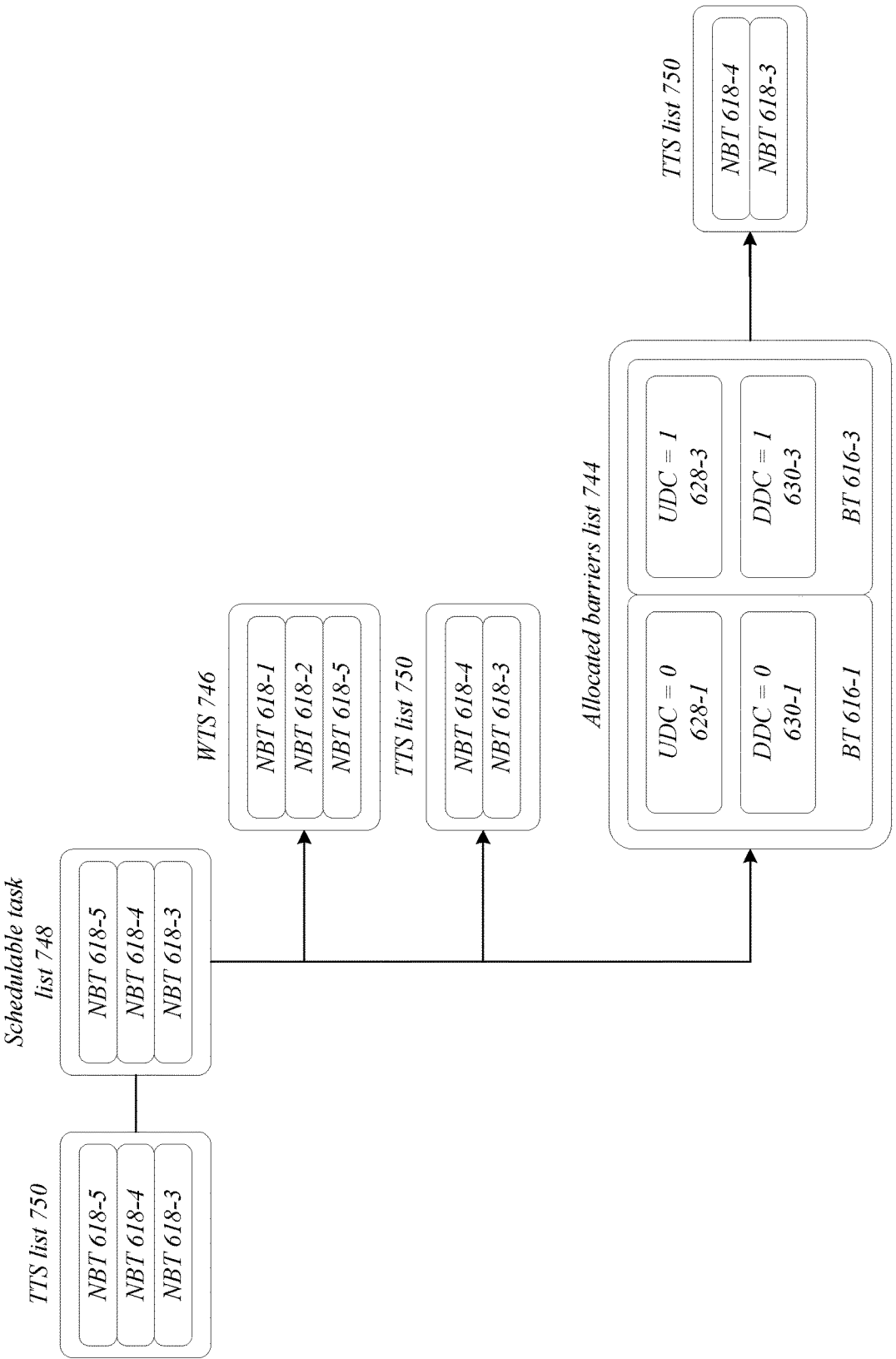
FIGS. 12A-12B illustrate exemplary seventh aspects of generating an execution schedule based on a computation graph according to one or more embodiments described herein.
Figure 12B:
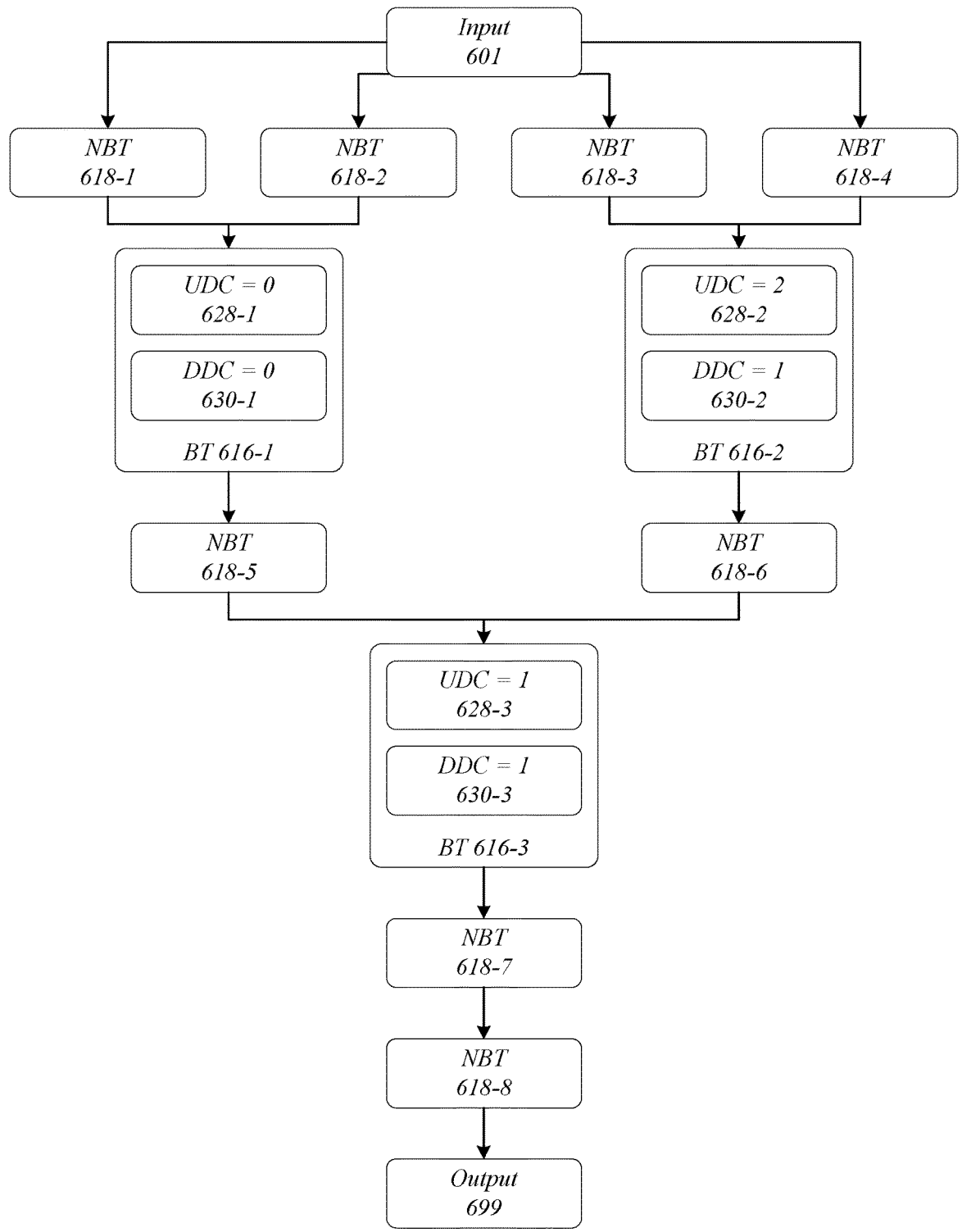

In some embodiments, environments 700A, 700B of FIGS. 7A and 7B may correspond to one or more of blocks 1401 to 1447 in process flow 1400. In various embodiments, environments 800A, 800B of FIGS. 8A and 8B may correspond to one or more of blocks 1419 to 1447 in process flow 1400. In many embodiments, environments 900A, 900B of FIGS. 9A and 9B may correspond to one or more of blocks 1419 to 1447 in process flow 1400. In several embodiments, environments 1000A, 1000B of FIGS. 10A and 10B may correspond to one or more of blocks 1419 to 1447 in process flow 1400. In several embodiments, environments 1000A, 1000B of FIGS. 10A and 10B may correspond to one or more of blocks 1419 to 1447 in process flow 1400. In various embodiments, environments 1100A, 1100B of FIGS. 11A and 11B may correspond to one or more of blocks 1419 to 1463 in process flow 1400. Additionally, schedulable task list 748 may comprise an empty list 1149 in FIG. 11A. In many embodiments, environments 1200A, 1200B of FIGS. 12A and 12B may correspond to one or more of blocks 1419 to 1447 in process flow 1400.

Referring back to FIGS. 14A-14C, the process flow 1400 may be representative of operations that may be executed in various embodiments in conjunction with techniques to generate execution schedules from neural network computation graphs. The logic flow 1400 may be representative of some or all of the operations that may be executed by one or more components/devices/environments described herein, such as scheduler 104. The embodiments are not limited in this context.

In the illustrated embodiment, process flow 1400 may start at block 1401. At block 1403, the computation graph may be traversed to generate two task lists to be used for scheduling. The first list may be a list of barrier tasks (e.g., BT list) as shown in subblock 1409. The second list may be a list of direct memory access and hardware accelerator tasks (e.g., NBT list) as shown in subblock 1411. Proceeding to block 1405, the tasks that have no barrier dependencies may be found (e.g., BUT list). Subblocks 1413 and 1415 of block 1405 illustrate one way to determine the tasks that have no barrier dependencies. At subblock 1413, three things may be done for each barrier in the BT list. First, the barrier's consumers (e.g., downstream dependencies) may be determined. Second, for each consumer, it may be determined whether it exists in the NBT list. Third, if a consumer exists in the NBT list it may be removed from the NBT list. After subblock 1413, at subblock 1415, the all tasks to be scheduled list (e.g., TTS list) may be populated with the tasks remaining in the NBT list (e.g., the BUT list).

Continuing to block 1407, the recursive scheduling algorithm may be proceeded to. At subblock 1417 of block 1407, three things may be passed to the recursive scheduling algorithm (in any order). First, the TTS list may be passed. Second, the schedulable task list may be passed (initially an empty list that will be populated with tasks that can be scheduled). Third, the allocated barriers list may be passed (a list of barrier required to execute the WTS at any point; initially an empty set that will be updated iteratively in the recursive scheduling routine; has a limit equal to the max barrier count).

At block 1419, the recursive scheduling routine may be entered. In the recursive scheduling routine, subblocks 1421 to 1447 may be performed for each task in the TTS list. At subblock 1421, for each task in the TTS list, it may be determined if the task can be scheduled (e.g., added to the schedulable task list) subject to these conditions: (1) the barriers that it requires can be added into the allocated barriers list without exceeding the hardware barrier limit; and/or (2) the barriers that it requires are already in the allocated barriers list. Continuing to subblock 1423, (1) for the task—get the barriers that the task requires (e.g., the barriers before and after the task); and (2) get the number of barriers that are already being used by the WTS. Proceeding to subblock 1425, for each barrier that the task requires: check if it is already in the allocated barriers list; if it is not in the list, then it is required, therefore increment the allocated barrier count. At subblock 1427 a true/false may be returned based on whether the task can be added to the schedulable task list. At subblock 1429, if true, then add the task to the schedulable task list.

Continuing to block 1431, each task in the schedulable task list may be iterated over. At block 1433, the task may be added to the WTS and at block 1435, the task may be removed from the TTS. Proceeding to block 1437, the barriers needed by the task may be added to the allocated barriers list. At block 1439, the physical barriers (e.g., UDCs and/or DDCs) may be updated as a new task has been added to the WTS. Continuing to block 1441, the physical barriers produced by the task (e.g., downstream of the task) may be found and their number of producers (e.g., UDC) may be reduced by one. At block 1443, the physical barriers consumed by the task (e.g., upstream of the task) may be found and their number of produces (e.g., DDC) may be reduced by one.

At block 1445 if the number of producers (e.g., UDC) equals zero, then the barrier's consumers (e.g., BT downstream dependencies) may be added to the TTS list. At block 1447 it may be determined whether another task can be added to the WTS without exceed the max barrier count. If another task can be added then process flow 1400 returns to block 1419 for another iteration. However, if another task cannot be added then process flow 1400 proceeds to the backtracking routine at block 1449.

At block 1451, the WTS may be back tracked on. Proceeding to block 1453, a task may be removed from the WTS (such as in a LIFO manner) and the task may be re-added to the TTS list at block 1455. Continuing to block 1457, the physical barriers may be updated as a new task has been removed from the WTS. At block 1459, the physical barriers produced by the task (e.g., downstream of the task) may be found and their number of producers (e.g., UDC) may be increased by one. At block 1461, the physical barriers consumed by the task (e.g., upstream of the task) may be found and their number of consumers (e.g., DDC) may be increased by one. At block 1463 the recursive scheduling routine may be returned to (e.g., return to block 1419).

Figure 15:
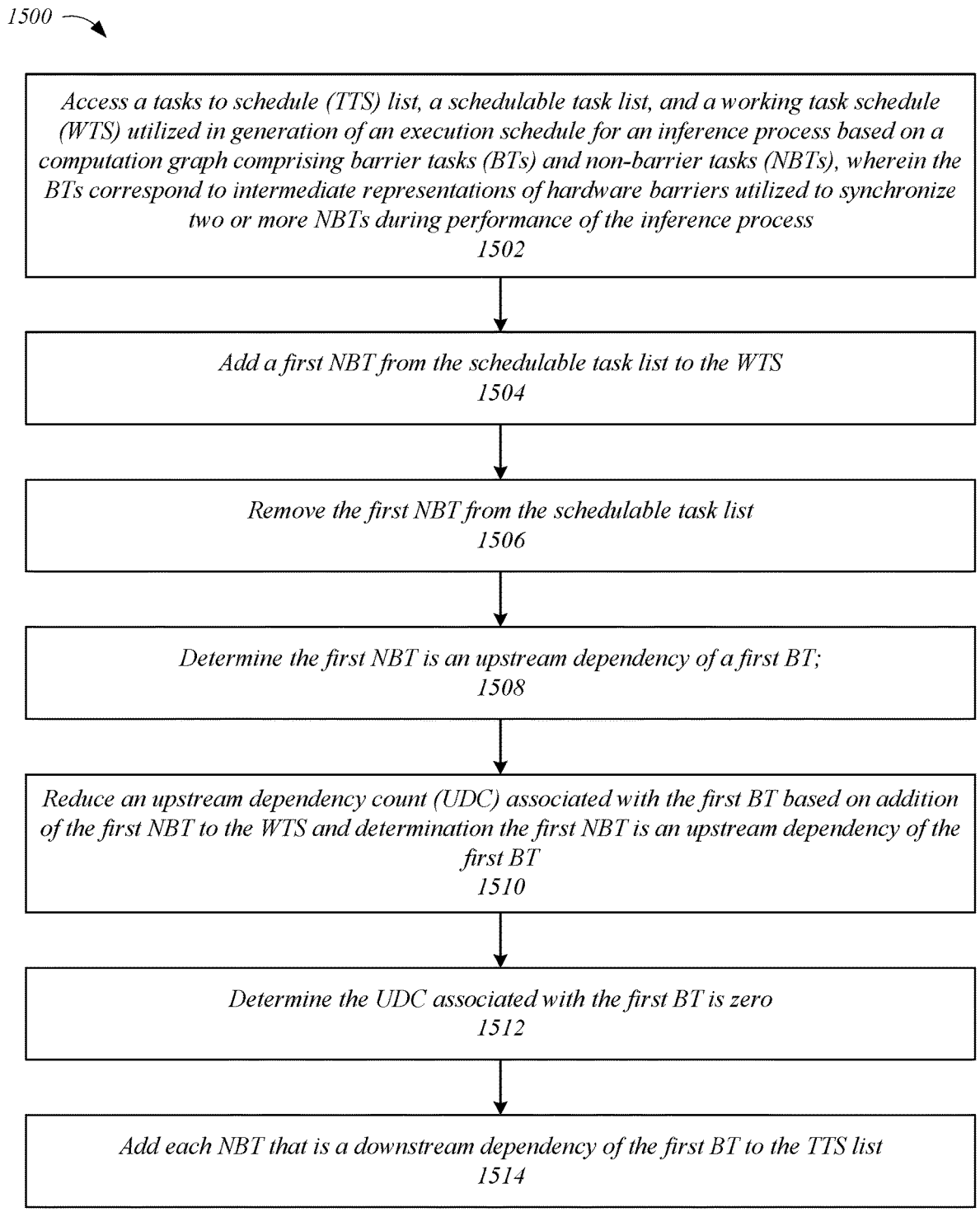
FIG. 15 illustrates an embodiment of a logic flow according to one or more embodiments described herein.

FIG. 15 illustrates one embodiment of a logic flow 1500, which may be representative of operations that may be executed in various embodiments in conjunction with techniques to generate execution schedules from neural network computation graphs. The logic flow 1500 may be representative of some or all of the operations that may be executed by one or more components/devices/environments described herein, such as scheduler 104. The embodiments are not limited in this context.

In the illustrated embodiment, logic flow 1500 may begin at block 1502. At block 1502 "access a tasks to schedule (TTS) list, a schedulable task list, and a working task schedule (WTS) utilized in generation of an execution schedule for an inference process based on a computation graph comprising barrier tasks (BTs) and non-barrier tasks (NBTs), wherein the BTs correspond to intermediate representations of hardware barriers utilized to synchronize two or more NBTs during performance of the inference process" a TTS list, a schedulable task list, and a WTS utilized in generation of an execution schedule for an inference process based on a computation graph comprising BTs and NBTs may be accessed. The BTs in the computation graph may correspond to intermediate representations of hardware barriers utilized to synchronize two or more NBTs during performance of the inference process. For example, schedule manager 114 may access WTS 346, schedulable task list 348, and TTS list 350 as part of generating execution schedule 106 based on computation graph 102. Proceeding to block 1504 "add a first NBT from the schedulable task list to the WTS" a first non-barrier task may be added to the WTS from the schedulable task list. For instance, NBT 618-1 may be added to WTS 746 from the schedulable task list 748 (see e.g., FIG. 7A), such as by list manager 110.

Continuing to block 1506 "remove the first NBT from the schedulable task list" the first NBT may be removed from the schedulable task list. For example, NBT 618-1 may be removed from the schedulable task list 748 (see e.g., FIG. 8A), such as by list manager 110. At block 1508 "determine the first NBT is an upstream dependency of a first BT" it may be determined that the first NBT is an upstream dependency of a first BT. For instance, graph analyzer 108 may determine NBT 618-1 is an upstream dependency of BT 616-1 (see e.g., FIG. 7B). Proceeding to block 1510 "reduce an upstream dependency count (UDC) associated with the first BT based on addition of the first NBT to the WTS and determination the first NBT is an upstream dependency of the first BT" a UDC associated with the first BT may be reduced based on addition of the first NBT to the WTS and determination the first NBT is an upstream dependency of the first BT. For example, allocation analyzer 112 may reduce UDC 628-1 associated with BT 616-1 based on addition of NBT 618-1 to the WTS list 746 and determination NBT 618-1 is an upstream dependency of BT 616-1 (see e.g., FIG. 7A).

At block 1512 "determine the UDC associated with the first BT is zero" it may be determined that the UDC associated with the first BT is zero. For instance, schedule manager 114 may determine UDC 628-1 of BT 616-1 is zero (see e.g., FIG. 10A). Continuing to block 1514 "add each NBT that is a downstream dependency of the first BT to the TTS list" each NBT that is a downstream dependency of the first BT may be added to the TTS list. For example, list manager 110 may add NBT 618-5 to TTS list 750 based on UDC 628-1 of BT 616-1 being zero (see e.g., FIG. 9A).

FIG. 16 illustrates an embodiment of a storage medium 1600. Storage medium 1600 may comprise any non-transitory computer-readable storage medium or machine-readable storage medium, such as an optical, magnetic or semiconductor storage medium. In various embodiments, storage medium 1600 may comprise an article of manufacture. In some embodiments, storage medium 1600 may store computer-executable instructions, such as computer-executable instructions to implement one or more of logic flows, processes, techniques, or operations described herein, such as with respect to logic flow 1500 of FIG. 15. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 17:
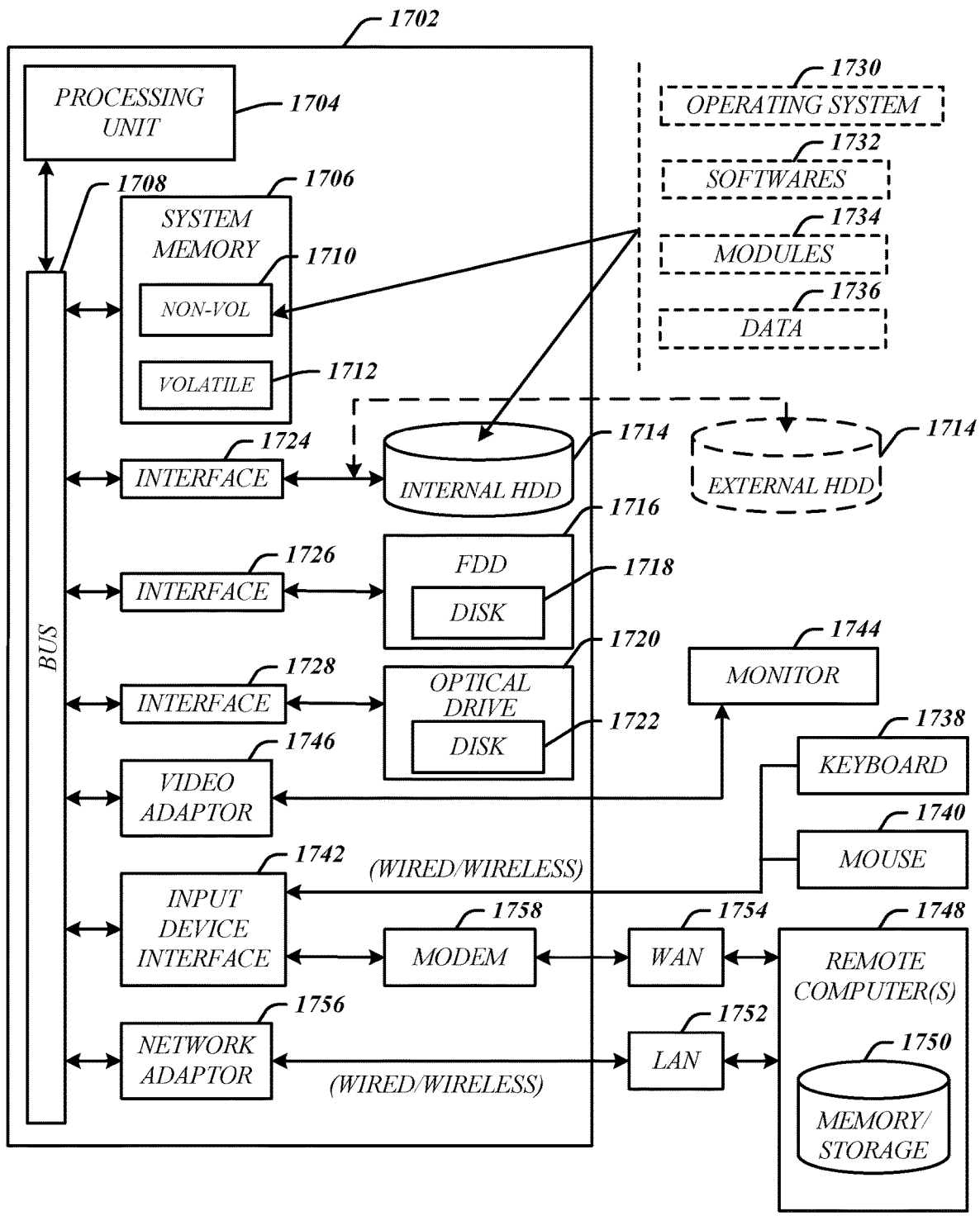
FIG. 17 illustrates an embodiment of a computing architecture according to one or more embodiments described herein.

FIG. 17 illustrates an embodiment of an exemplary computing architecture 1700 that may be suitable for implementing various embodiments as previously described. In various embodiments, the computing architecture 1700 may comprise or be implemented as part of an electronic device. In some embodiments, the computing architecture 1700 may be representative, for example, of one or more component described herein. In some embodiments, computing architecture 1700 may be representative, for example, of a computing device that implements or utilizes one or more portions of scheduler 104 and/or one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1700.

As shown in FIG. 17, the computing architecture 1700 comprises a processing unit 1704, a system memory 1706 and a system bus 1708. The processing unit 1704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1704.

The system bus 1708 provides an interface for system components including, but not limited to, the system memory 1706 to the processing unit 1704. The system bus 1708 can be any of several types of bus structure that may further interconnect to a memory bus (with or without a memory controller), a peripheral bus, and a local bus using any of a variety of commercially available bus architectures. Interface adapters may connect to the system bus 1708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 17, the system memory 1706 can include non-volatile memory 1710 and/or volatile memory 1712. In some embodiments, system memory 1706 may include main memory. A basic input/output system (BIOS) can be stored in the non-volatile memory 1710.

The computer 1702 may include various types of computer-readable storage media in the form of one or more lower speed memory units, including an internal (or external) hard disk drive (HDD) 1714, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by an HDD interface 1724, an FDD interface 1726 and an optical drive interface 1728, respectively. The HDD interface 1724 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736. In one embodiment, the one or more application programs 1732, other program modules 1734, and program data 1736 can include or implement, for example, the various techniques, applications, and/or components described herein.

A user can enter commands and information into the computer 1702 through one or more wire/wireless input devices, for example, a keyboard 1738 and a pointing device, such as a mouse 1740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1704 through an input device interface 1742 that is coupled to the system bus 1708 but can be connected by other interfaces such as a parallel port, IEEE 994 serial port, a game port, a USB port, an IR interface, and so forth.

A monitor 1744 or other type of display device is also connected to the system bus 1708 via an interface, such as a video adaptor 1746. The monitor 1744 may be internal or external to the computer 1702. In addition to the monitor 1744, a computer typically includes other peripheral output devices, such as speakers, printers, and so forth.

The computer 1702 may operate in a networked environment using logical connections via wire and/or wireless communications to one or more remote computers, such as a remote computer 1748. In various embodiments, one or more interactions described herein may occur via the networked environment. The remote computer 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wire and/or wireless communication network interface or adaptor 1756. The adaptor 1756 can facilitate wire and/or wireless communications to the LAN 1752, which may also include a wireless access point disposed thereon for communicating with the wireless functionality of the adaptor 1756.

When used in a WAN networking environment, the computer 1702 can include a modem 1758, or is connected to a communications server on the WAN 1754 or has other means for establishing communications over the WAN 1754, such as by way of the Internet. The modem 1758, which can be internal or external and a wire and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 18:
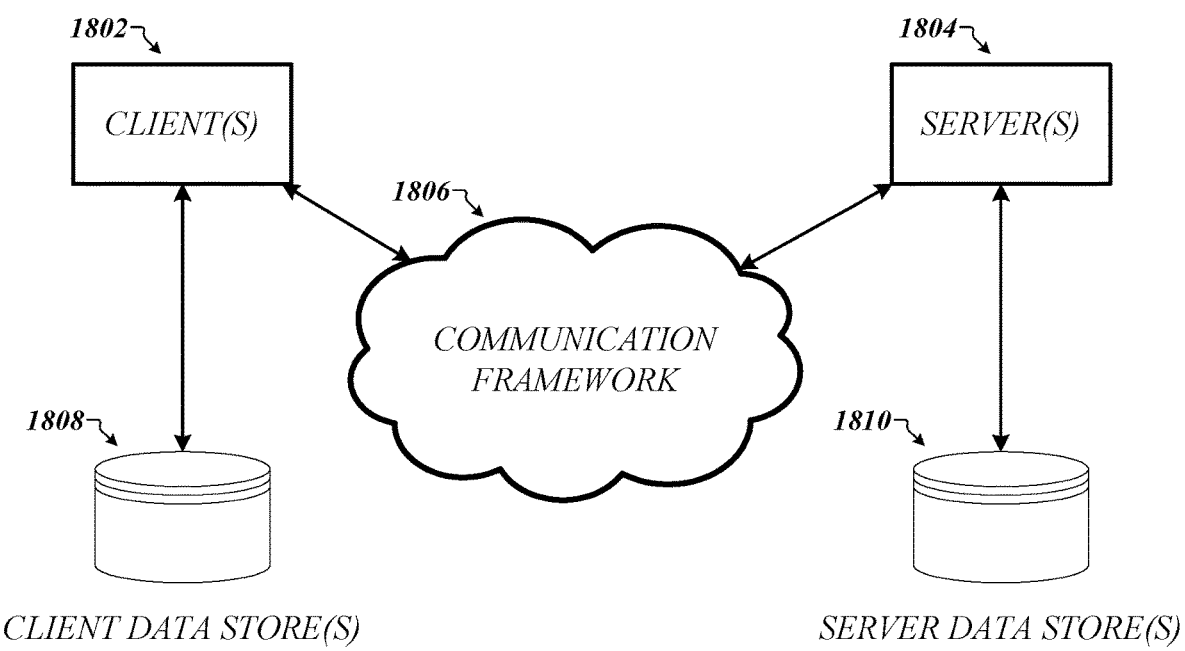
FIG. 18 illustrates an embodiment of a communications architecture according to one or more embodiments described herein.

FIG. 18 illustrates a block diagram of an exemplary communications architecture 1800 that may be suitable for implementing various embodiments as previously described. The communications architecture 1800 includes various common communications elements, such as a transmitter, receiver, transceiver, radio, network interface, baseband processor, antenna, amplifiers, filters, power supplies, and so forth. The embodiments, however, are not limited to implementation by the communications architecture 1800.

As shown in FIG. 18, the communications architecture 1800 comprises includes one or more clients 1802 and servers 1804. In some embodiments, communications architecture may include or implement one or more portions of components, applications, and/or techniques described herein. The clients 1802 and the servers 1804 are operatively connected to one or more respective client data stores 1808 and server data stores 1810 that can be employed to store information local to the respective clients 1802 and servers 1804, such as cookies and/or associated contextual information. In various embodiments, any one of servers 1804 may implement one or more of logic flows or operations described herein, and storage medium 1600 of FIG. 16 in conjunction with storage of data received from any one of clients 1802 on any of server data stores 1810. In one or more embodiments, one or more of client data store(s) 1808 or server data store(s) 1810 may include memory accessible to one or more portions of components, applications, and/or techniques described herein.

The clients 1802 and the servers 1804 may communicate information between each other using a communication framework 1806. The communications framework 1806 may implement any well-known communications techniques and protocols. The communications framework 1806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1802 and the servers 1804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor; and memory comprising instructions that when executed by the processor cause the processor to: add a first non-barrier task (NBT) from a schedulable task list to a working task schedule (WTS) utilized in production of an execution schedule for an inference process; determine the first NBT is an upstream dependency of a first barrier task (BT) based on a computation graph comprising BTs and NBTs, wherein the BTs correspond to hardware barriers utilized during performance of the inference process; reduce an upstream dependency count (UDC) associated with a first BT based on a determination the first NBT is an upstream dependency of the first BT; determine the UDC associated with the first BT is zero; and add each NBT that is a downstream dependency of the first BT to a tasks to schedule (TTS) list.

Example 2 includes the subject matter of Example 1, the memory comprising instructions that when executed by the processor cause the processor to output the WTS as the execution schedule for the inference process when each NBT in the computation graph has been added to the WTS.

Example 3 includes the subject matter of Example 1, wherein the execution schedule for the inference process comprises a first in first out (FIFO) schedule of NBTs.

Example 4 includes the subject matter of Example 1, wherein the NBTs in the computation graph comprise at least one direct memory access (DMA), at least one convolution, and at least one summation.

Example 5 includes the subject matter of Example 1, wherein each hardware barrier corresponds to a hardware register.

Example 6 includes the subject matter of Example 1, the memory comprising instructions that when executed by the processor cause the processor to: determine the first NBT can be added to the WTS from the TTS list without exceeding a maximum barrier count; and add the first NBT to the schedulable task list based on determination the first NBT can be added to the WTS without exceeding the maximum barrier count.

Example 7 includes the subject matter of Example 6, wherein determination the first NBT in the TTS list can be added to the WTS without exceeding the maximum barrier count comprises instructions in the memory that when executed by the processor cause the processor to: determine a first set of BTs that correspond to the first NBT, the first set of BTs including the first BT, wherein each BT in the first set of BTs comprise an upstream or a downstream dependency to the first NBT; determine which BTs in the first set of BTs is absent from an allocated barrier list; increment an allocated barrier count for each BT in the first set of BTs that is absent from the allocated barrier list; and determine the allocated barrier count incremented for each BT in the first set of BTs that is absent from the allocated barrier list is less than the maximum barrier count.

Example 8 includes the subject matter of Example 1, the memory comprising instructions that when executed by the processor cause the processor to: add a second NBT from the schedulable task list to the WTS; remove the second NBT from the schedulable task list; determine the second NBT is a downstream dependency of the first BT; and reduce a downstream dependency count (DDC) associated with the first BT based on addition of the second NBT to the WTS and determination the second NBT is a downstream dependency of the first BT.

Example 9 includes the subject matter of Example 1, the memory comprising instructions that when executed by the processor cause the processor to, in response to addition of the first NBT to the WTS, add the first BT to an allocated barriers list based on a determination the first BT is absent from the allocated barriers list.

Example 10 includes the subject matter of Example 1, the memory comprising instructions that when executed by the processor cause the processor to: determine an inability to build the execution schedule based on exceeding a maximum barrier count; and backtrack on the WTS to remove one or more NBTs from the WTS.

Example 11 includes the subject matter of Example 10, wherein the maximum barrier count corresponds to a maximum number of registers available for BTs.

Example 12 includes the subject matter of Example 10, wherein backtracking on the WTS to remove the one or more NBTs from the WTS comprises instructions in the memory that when executed by the processor cause the processor to: remove a second NBT from the WTS; add the second NBT to the TTS list; determine the second NBT is an upstream dependency of a second BT; and increment a UDC associated with the second BT based on removal of the second NBT from the WTS and determination the second NBT is an upstream dependency of the second BT.

Example 13 includes the subject matter of Example 12, wherein backtracking on the WTS to remove the one or more NBTs from the WTS comprises instructions in the memory that when executed by the processor cause the processor to remove the second BT from an allocated barriers list and decrement an allocated barrier count based on a determination the WTS includes no NBTs with upstream or downstream dependencies to the second BT.

Example 14 includes the subject matter of Example 12, wherein backtracking on the WTS to remove the one or more NBTs from the WTS comprises instructions in the memory that when executed by the processor cause the processor to: determine the second NBT is a downstream dependency of the first BT; and increment a DDC associated with the first BT based on removal of the second NBT from the WTS and determination the second NBT is a downstream dependency of the first BT.

Example 15 includes the subject matter of Example 1, the memory comprising instructions that when executed by the processor cause the processor to remove the first NBT from the TTS list based on addition of the first NBT to the WTS.

Example 16 includes the subject matter of Example 1, the memory comprising instructions that when executed by the processor cause the processor to traverse the computation graph to generate the TTS list.

Example 17 includes the subject matter of Example 1, the memory comprising instructions that when executed by the processor cause the processor to traverse the computation graph to generate a BT list, an NBT list, BT dependency data, and NBT dependency data.

Example 18 includes the subject matter of Example 1, wherein NBTs in the TTS list are manipulated in a first in first out (FIFO) manner.

Example 19 includes the subject matter of Example 1, wherein NBTs in the schedulable task list are manipulated in a first in first out (FIFO) manner.

Example 20 includes the subject matter of Example 1, wherein NBTs in the WTS are removed in a last in first out (LIFO) manner.

Example 21 includes the subject matter of Example 1, wherein the execution schedule is configured to run on a heterogeneous processor.

Example 22 includes the subject matter of Example 21, wherein the heterogeneous processor comprises a neural network and an image processing accelerator.

Example 23 includes the subject matter of Example 1, wherein the BTs comprise data objects inserted into an intermediate representation of the computation graph.

Example 24 is at least one non-transitory computer-readable medium comprising a set of instructions that, in response to being executed by a processor circuit, cause the processor circuit to: add a first non-barrier task (NBT) from a schedulable task list to a working task schedule (WTS) utilized in production of an execution schedule for an inference process; determine the first NBT is an upstream dependency of a first barrier task (BT) based on a computation graph comprising BTs and NBTs, wherein the BTs correspond to hardware barriers utilized during performance of the inference process; reduce an upstream dependency count (UDC) associated with a first BT based on a determination the first NBT is an upstream dependency of the first BT; determine the UDC associated with the first BT is zero; and add each NBT that is a downstream dependency of the first BT to a tasks to schedule (TTS) list.

Example 25 includes the subject matter of Example 24, comprising instructions that, in response to being executed by the processor circuit cause the processor circuit to output the WTS as the execution schedule for the inference process when each NBT in the computation graph has been added to the WTS.

Example 26 includes the subject matter of Example 24, wherein the execution schedule for the inference process comprises a first in first out (FIFO) schedule of NBTs.

Example 27 includes the subject matter of Example 24, wherein the NBTs in the computation graph comprise at least one direct memory access (DMA), at least one convolution, and at least one summation.

Example 28 includes the subject matter of Example 24, wherein each hardware barrier corresponds to a hardware register.

Example 29 includes the subject matter of Example 24, comprising instructions that, in response to being executed by the processor circuit cause the processor circuit to: determine the first NBT can be added to the WTS from the TTS list without exceeding a maximum barrier count; and add the first NBT to the schedulable task list based on determination the first NBT can be added to the WTS without exceeding the maximum barrier count.

Example 30 includes the subject matter of Example 29, wherein determination the first NBT in the TTS list can be added to the WTS without exceeding the maximum barrier count comprises instructions in the at least one non-transitory computer-readable medium that, in response to being executed by the processor circuit cause the processor circuit to: determine a first set of BTs that correspond to the first NBT, the first set of BTs including the first BT, wherein each BT in the first set of BTs comprise an upstream or a downstream dependency to the first NBT; determine which BTs in the first set of BTs is absent from an allocated barrier list; increment an allocated barrier count for each BT in the first set of BTs that is absent from the allocated barrier list; and determine the allocated barrier count incremented for each BT in the first set of BTs that is absent from the allocated barrier list is less than the maximum barrier count.

Example 31 includes the subject matter of Example 24, comprising instructions that, in response to being executed by the processor circuit cause the processor circuit to: add a second NBT from the schedulable task list to the WTS; remove the second NBT from the schedulable task list; determine the second NBT is a downstream dependency of the first BT; and reduce a downstream dependency count (DDC) associated with the first BT based on addition of the second NBT to the WTS and determination the second NBT is a downstream dependency of the first BT.

Example 32 includes the subject matter of Example 24, comprising instructions that, in response to being executed by the processor circuit cause the processor circuit to, in response to addition of the first NBT to the WTS, add the first BT to an allocated barriers list based on a determination the first BT is absent from the allocated barriers list.

Example 33 includes the subject matter of Example 24, comprising instructions that, in response to being executed by the processor circuit cause the processor circuit to: determine an inability to build the execution schedule based on exceeding a maximum barrier count; and backtrack on the WTS to remove one or more NBTs from the WTS.

Example 34 includes the subject matter of Example 33, wherein the maximum barrier count corresponds to a maximum number of registers available for BTs.

Example 35 includes the subject matter of Example 33, wherein backtracking on the WTS to remove the one or more NBTs from the WTS comprises instructions in the at least one non-transitory computer-readable medium that, in response to being executed by the processor circuit cause the processor circuit to: remove a second NBT from the WTS; add the second NBT to the TTS list; determine the second NBT is an upstream dependency of a second BT; and increment a UDC associated with the second BT based on removal of the second NBT from the WTS and determination the second NBT is an upstream dependency of the second BT.

Example 36 includes the subject matter of Example 35, wherein backtracking on the WTS to remove the one or more NBTs from the WTS comprises instructions in the at least one non-transitory computer-readable medium that, in response to being executed by the processor circuit cause the processor circuit to remove the second BT from an allocated barriers list and decrement an allocated barrier count based on a determination the WTS includes no NBTs with upstream or downstream dependencies to the second BT.

Example 37 includes the subject matter of Example 35, wherein backtracking on the WTS to remove the one or more NBTs from the WTS comprises instructions in the at least one non-transitory computer-readable medium that, in response to being executed by the processor circuit cause the processor circuit to: determine the second NBT is a downstream dependency of the first BT; and increment a DDC associated with the first BT based on removal of the second NBT from the WTS and determination the second NBT is a downstream dependency of the first BT.

Example 38 includes the subject matter of Example 24, comprising instructions that, in response to being executed by the processor circuit cause the processor circuit to remove the first NBT from the TTS list based on addition of the first NBT to the WTS.

Example 39 includes the subject matter of Example 24, comprising instructions that, in response to being executed by the processor circuit cause the processor circuit to traverse the computation graph to generate the TTS list.

Example 40 includes the subject matter of Example 24, comprising instructions that, in response to being executed by the processor circuit cause the processor circuit to traverse the computation graph to generate a BT list, an NBT list, BT dependency data, and NBT dependency data.

Example 41 includes the subject matter of Example 24, wherein NBTs in the TTS list are manipulated in a first in first out (FIFO) manner.

Example 42 includes the subject matter of Example 24, wherein NBTs in the schedulable task list are manipulated in a first in first out (FIFO) manner.

Example 43 includes the subject matter of Example 24, wherein NBTs in the WTS are removed in a last in first out (LIFO) manner.

Example 44 includes the subject matter of Example 24, wherein the execution schedule is configured to run on a heterogeneous processor.

Example 45 includes the subject matter of Example 44, wherein the heterogeneous processor comprises a neural network and an image processing accelerator.

Example 46 includes the subject matter of Example 24, wherein the BTs comprise data objects inserted into an intermediate representation of the computation graph.

Example 47 is a computer-implemented method comprising: adding a first non-barrier task (NBT) from a schedulable task list to a working task schedule (WTS) utilized in production of an execution schedule for an inference process; determining the first NBT is an upstream dependency of a first barrier task (BT) based on a computation graph comprising BTs and NBTs, wherein the BTs correspond to hardware barriers utilized during performance of the inference process; reducing an upstream dependency count (UDC) associated with a first BT based on a determination the first NBT is an upstream dependency of the first BT; determining the UDC associated with the first BT is zero; and adding each NBT that is a downstream dependency of the first BT to a tasks to schedule (TTS) list.

Example 48 includes the subject matter of Example 47, comprising outputting the WTS as the execution schedule for the inference process when each NBT in the computation graph has been added to the WTS.

Example 49 includes the subject matter of Example 47, wherein the execution schedule for the inference process comprises a first in first out (FIFO) schedule of NBTs.

Example 50 includes the subject matter of Example 47, wherein the NBTs in the computation graph comprise at least one direct memory access (DMA), at least one convolution, and at least one summation.

Example 51 includes the subject matter of Example 47, wherein each hardware barrier corresponds to a hardware register.

Example 52 includes the subject matter of Example 47, comprising: determining the first NBT can be added to the WTS from the TTS list without exceeding a maximum barrier count; and adding the first NBT to the schedulable task list based on determination the first NBT can be added to the WTS without exceeding the maximum barrier count.

Example 53 includes the subject matter of Example 52, wherein determining the first NBT in the TTS list can be added to the WTS without exceeding the maximum barrier count includes: determining a first set of BTs that correspond to the first NBT, the first set of BTs including the first BT, wherein each BT in the first set of BTs comprise an upstream or a downstream dependency to the first NBT; determining which BTs in the first set of BTs is absent from an allocated barrier list; incrementing an allocated barrier count for each BT in the first set of BTs that is absent from the allocated barrier list; and determining the allocated barrier count incremented for each BT in the first set of BTs that is absent from the allocated barrier list is less than the maximum barrier count.

Example 54 includes the subject matter of Example 47, comprising: adding a second NBT from the schedulable task list to the WTS; removing the second NBT from the schedulable task list; determining the second NBT is a downstream dependency of the first BT; and reducing a downstream dependency count (DDC) associated with the first BT based on addition of the second NBT to the WTS and determination the second NBT is a downstream dependency of the first BT.

Example 55 includes the subject matter of Example 47, comprising, in response to addition of the first NBT to the WTS, adding the first BT to an allocated barriers list based on a determination the first BT is absent from the allocated barriers list.

Example 56 includes the subject matter of Example 47, comprising: determining an inability to build the execution schedule based on exceeding a maximum barrier count; and backtracking on the WTS to remove one or more NBTs from the WTS.

Example 57 includes the subject matter of Example 56, wherein the maximum barrier count corresponds to a maximum number of registers available for BTs.

Example 58 includes the subject matter of Example 56, wherein backtracking on the WTS to remove the one or more NBTs from the WTS includes: removing a second NBT from the WTS; adding the second NBT to the TTS list; determining the second NBT is an upstream dependency of a second BT; and incrementing a UDC associated with the second BT based on removal of the second NBT from the WTS and determination the second NBT is an upstream dependency of the second BT.

Example 59 includes the subject matter of Example 58, wherein backtracking on the WTS to remove the one or more NBTs from the WTS includes removing the second BT from an allocated barriers list and decrement an allocated barrier count based on a determination the WTS includes no NBTs with upstream or downstream dependencies to the second BT.

Example 60 includes the subject matter of Example 58, wherein backtracking on the WTS to remove the one or more NBTs from the WTS includes: determining the second NBT is a downstream dependency of the first BT; and incrementing a DDC associated with the first BT based on removal of the second NBT from the WTS and determination the second NBT is a downstream dependency of the first BT.

Example 61 includes the subject matter of Example 47, comprising removing the first NBT from the TTS list based on addition of the first NBT to the WTS.

Example 62 includes the subject matter of Example 47, comprising traversing the computation graph to generate the TTS list.

Example 63 includes the subject matter of Example 47, comprising traversing the computation graph to generate a BT list, an NBT list, BT dependency data, and NBT dependency data.

Example 64 includes the subject matter of Example 47, wherein NBTs in the TTS list are manipulated in a first in first out (FIFO) manner.

Example 65 includes the subject matter of Example 47, wherein NBTs in the schedulable task list are manipulated in a first in first out (FIFO) manner.

Example 66 includes the subject matter of Example 47, wherein NBTs in the WTS are removed in a last in first out (LIFO) manner.

Example 67 includes the subject matter of Example 47, wherein the execution schedule is configured to run on a heterogeneous processor.

Example 68 includes the subject matter of Example 67, wherein the heterogeneous processor comprises a neural network and an image processing accelerator.

Example 69 includes the subject matter of Example 47, wherein the BTs comprise data objects inserted into an intermediate representation of the computation graph.

Example 70 is an apparatus comprising: means for adding a first non-barrier task (NBT) from a schedulable task list to a working task schedule (WTS) utilized in production of an execution schedule for an inference process; means for determining the first NBT is an upstream dependency of a first barrier task (BT) based on a computation graph comprising BTs and NBTs, wherein the BTs correspond to hardware barriers utilized during performance of the inference process; means for reducing an upstream dependency count (UDC) associated with a first BT based on a determination the first NBT is an upstream dependency of the first BT; means for determining the UDC associated with the first BT is zero; and means for adding each NBT that is a downstream dependency of the first BT to a tasks to schedule (TTS) list.

Example 71 includes the subject matter of Example 70, comprising means for outputting the WTS as the execution schedule for the inference process when each NBT in the computation graph has been added to the WTS.

Example 72 includes the subject matter of Example 70, wherein the execution schedule for the inference process comprises a first in first out (FIFO) schedule of NBTs.

Example 73 includes the subject matter of Example 70, wherein the NBTs in the computation graph comprise at least one direct memory access (DMA), at least one convolution, and at least one summation.

Example 74 includes the subject matter of Example 70, wherein each hardware barrier corresponds to a hardware register.

Example 75 includes the subject matter of Example 70, comprising: means for determining the first NBT can be added to the WTS from the TTS list without exceeding a maximum barrier count; and means for adding the first NBT to the schedulable task list based on determination the first NBT can be added to the WTS without exceeding the maximum barrier count.

Example 76 includes the subject matter of Example 75, wherein determining the first NBT in the TTS list can be added to the WTS without exceeding the maximum barrier count includes: means for determining a first set of BTs that correspond to the first NBT, the first set of BTs including the first BT, wherein each BT in the first set of BTs comprise an upstream or a downstream dependency to the first NBT; means for determining which BTs in the first set of BTs is absent from an allocated barrier list; means for incrementing an allocated barrier count for each BT in the first set of BTs that is absent from the allocated barrier list; and means for determining the allocated barrier count incremented for each BT in the first set of BTs that is absent from the allocated barrier list is less than the maximum barrier count.

Example 77 includes the subject matter of Example 70, comprising: means for adding a second NBT from the schedulable task list to the WTS; means for removing the second NBT from the schedulable task list; means for determining the second NBT is a downstream dependency of the first BT; and means for reducing a downstream dependency count (DDC) associated with the first BT based on addition of the second NBT to the WTS and determination the second NBT is a downstream dependency of the first BT.

Example 78 includes the subject matter of Example 70, comprising means for, in response to addition of the first NBT to the WTS, adding the first BT to an allocated barriers list based on a determination the first BT is absent from the allocated barriers list.

Example 79 includes the subject matter of Example 70, comprising: means for determining an inability to build the execution schedule based on exceeding a maximum barrier count; and means for backtracking on the WTS to remove one or more NBTs from the WTS.

Example 80 includes the subject matter of Example 79, wherein the maximum barrier count corresponds to a maximum number of registers available for BTs.

Example 81 includes the subject matter of Example 79, wherein backtracking on the WTS to remove the one or more NBTs from the WTS includes: means for removing a second NBT from the WTS; means for adding the second NBT to the TTS list; means for determining the second NBT is an upstream dependency of a second BT; and means for incrementing a UDC associated with the second BT based on removal of the second NBT from the WTS and determination the second NBT is an upstream dependency of the second BT.

Example 82 includes the subject matter of Example 81, wherein backtracking on the WTS to remove the one or more NBTs from the WTS includes means for removing the second BT from an allocated barriers list and decrement an allocated barrier count based on a determination the WTS includes no NBTs with upstream or downstream dependencies to the second BT.

Example 83 includes the subject matter of Example 81, wherein backtracking on the WTS to remove the one or more NBTs from the WTS includes: means for determining the second NBT is a downstream dependency of the first BT; and means for incrementing a DDC associated with the first BT based on removal of the second NBT from the WTS and determination the second NBT is a downstream dependency of the first BT.

Example 84 includes the subject matter of Example 70, comprising means for removing the first NBT from the TTS list based on addition of the first NBT to the WTS.

Example 85 includes the subject matter of Example 70, comprising means for traversing the computation graph to generate the TTS list.

Example 86 includes the subject matter of Example 70, comprising means for traversing the computation graph to generate a BT list, an NBT list, BT dependency data, and NBT dependency data.

Example 87 includes the subject matter of Example 70, wherein NBTs in the TTS list are manipulated in a first in first out (FIFO) manner.

Example 88 includes the subject matter of Example 70, wherein NBTs in the schedulable task list are manipulated in a first in first out (FIFO) manner.

Example 89 includes the subject matter of Example 70, wherein NBTs in the WTS are removed in a last in first out (LIFO) manner.

Example 90 includes the subject matter of Example 70, wherein the execution schedule is configured to run on a heterogeneous processor.

Example 91 includes the subject matter of Example 90, wherein the heterogeneous processor comprises a neural network and an image processing accelerator.

Example 92 includes the subject matter of Example 70, wherein the BTs comprise data objects inserted into an intermediate representation of the computation graph.

Example 93 is an apparatus, the apparatus comprising: a processor; and memory comprising instructions that when executed by the processor cause the processor to: access a tasks to schedule (TTS) list, a schedulable task list, and a working task schedule (WTS) utilized in generation of an execution schedule for an inference process based on a computation graph comprising barrier tasks (BTs) and non-barrier tasks (NBTs), wherein the BTs correspond to intermediate representations of hardware barriers utilized to synchronize two or more NBTs during performance of the inference process; add a first NBT from the schedulable task list to the WTS; remove the first NBT from the schedulable task list; determine the first NBT is an upstream dependency of a first BT; reduce an upstream dependency count (UDC) associated with the first BT based on addition of the first NBT to the WTS and determination the first NBT is an upstream dependency of the first BT; determine the UDC associated with the first BT is zero; and add each NBT that is a downstream dependency of the first BT to the TTS list.

Example 94 is at least one non-transitory computer-readable medium comprising a set of instructions that, in response to being executed by a processor circuit, cause the processor circuit to: access a tasks to schedule (TTS) list, a schedulable task list, and a working task schedule (WTS) utilized in generation of an execution schedule for an inference process based on a computation graph comprising barrier tasks (BTs) and non-barrier tasks (NBTs), wherein the BTs correspond to intermediate representations of hardware barriers utilized to synchronize two or more NBTs during performance of the inference process; add a first NBT from the schedulable task list to the WTS; remove the first NBT from the schedulable task list; determine the first NBT is an upstream dependency of a first BT; reduce an upstream dependency count (UDC) associated with the first BT based on addition of the first NBT to the WTS and determination the first NBT is an upstream dependency of the first BT; determine the UDC associated with the first BT is zero; and add each NBT that is a downstream dependency of the first BT to the TTS list.

Example 95 is a computer-implemented method comprising: accessing a tasks to schedule (TTS) list, a schedulable task list, and a working task schedule (WTS) utilized in generation of an execution schedule for an inference process based on a computation graph comprising barrier tasks (BTs) and non-barrier tasks (NBTs), wherein the BTs correspond to intermediate representations of hardware barriers utilized to synchronize two or more NBTs during performance of the inference process; adding a first NBT from the schedulable task list to the WTS; removing the first NBT from the schedulable task list; determining the first NBT is an upstream dependency of a first BT; reducing an upstream dependency count (UDC) associated with the first BT based on addition of the first NBT to the WTS and determination the first NBT is an upstream dependency of the first BT; determining the UDC associated with the first BT is zero; and adding each NBT that is a downstream dependency of the first BT to the TTS list.

Example 96 is an apparatus comprising: means for accessing a tasks to schedule (TTS) list, a schedulable task list, and a working task schedule (WTS) utilized in generation of an execution schedule for an inference process based on a computation graph comprising barrier tasks (BTs) and non-barrier tasks (NBTs), wherein the BTs correspond to intermediate representations of hardware barriers utilized to synchronize two or more NBTs during performance of the inference process; means for adding a first NBT from the schedulable task list to the WTS; means for removing the first NBT from the schedulable task list; means for determining the first NBT is an upstream dependency of a first BT; means for reducing an upstream dependency count (UDC) associated with the first BT based on addition of the first NBT to the WTS and determination the first NBT is an upstream dependency of the first BT; means for determining the UDC associated with the first BT is zero; and means for adding each NBT that is a downstream dependency of the first BT to the TTS list The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, the apparatus comprising:
a processor; and
memory comprising instructions that when executed by the processor cause the processor to:
add a first non-barrier task (NBT) from a schedulable task list to a working task schedule (WTS) utilized in production of an execution schedule for an inference process for a neural network application;
determine the first NBT is an upstream dependency of a first barrier task (BT) based on a computation graph comprising BTs and NBTs, wherein the BTs correspond to hardware barriers utilized during performance of the inference process;
reduce an upstream dependency count (UDC) associated with a first BT by a defined value from a current count value based on a determination the first NBT is an upstream dependency of the first BT;
determine the UDC associated with the first BT is zero; and
add each NBT that is a downstream dependency of the first BT to a tasks to schedule (TTS) list based on the determination of the UDC associated with the first BT is zero.

2. The apparatus of claim 1, the memory comprising instructions that when executed by the processor cause the processor to output the WTS as the execution schedule for the inference process when each NBT in the computation graph has been added to the WTS.

3. The apparatus of claim 1, wherein the execution schedule for the inference process comprises a first in first out (FIFO) schedule of NBTs.

4. The apparatus of claim 1, wherein the NBTs in the computation graph comprise at least one direct memory access (DMA), at least one convolution, and at least one summation.

5. The apparatus of claim 1, wherein each hardware barrier corresponds to a hardware register.

6. The apparatus of claim 1, the memory comprising instructions that when executed by the processor cause the processor to:
determine the first NBT can be added to the WTS from the TTS list without exceeding a maximum barrier count; and
add the first NBT to the schedulable task list based on determination the first NBT can be added to the WTS without exceeding the maximum barrier count.

7. The apparatus of claim 6, wherein determination the first NBT in the TTS list can be added to the WTS without exceeding the maximum barrier count comprises instructions in the memory that when executed by the processor cause the processor to:
determine a first set of BTs that correspond to the first NBT, the first set of BTs including the first BT, wherein each BT in the first set of BTs comprise an upstream or a downstream dependency to the first NBT;
determine which BTs in the first set of BTs is absent from an allocated barrier list;
increment an allocated barrier count for each BT in the first set of BTs that is absent from the allocated barrier list; and
determine the allocated barrier count incremented for each BT in the first set of BTs that is absent from the allocated barrier list is less than the maximum barrier count.

8. The apparatus of claim 1, the memory comprising instructions that when executed by the processor cause the processor to:
add a second NBT from the schedulable task list to the WTS;
remove the second NBT from the schedulable task list;
determine the second NBT is a downstream dependency of the first BT; and
reduce a downstream dependency count (DDC) associated with the first BT based on addition of the second NBT to the WTS and determination the second NBT is a downstream dependency of the first BT.

9. The apparatus of claim 1, the memory comprising instructions that when executed by the processor cause the processor to, in response to addition of the first NBT to the WTS, add the first BT to an allocated barriers list based on a determination the first BT is absent from the allocated barriers list.

10. The apparatus of claim 1, the memory comprising instructions that when executed by the processor cause the processor to:
determine an inability to build the execution schedule based on exceeding a maximum barrier count; and
backtrack on the WTS to remove one or more NBTs from the WTS.

11. The apparatus of claim 10, wherein the maximum barrier count corresponds to a maximum number of registers available for BTs.

12. The apparatus of claim 10, wherein backtracking on the WTS to remove the one or more NBTs from the WTS comprises instructions in the memory that when executed by the processor cause the processor to:
remove a second NBT from the WTS;
add the second NBT to the TTS list;
determine the second NBT is an upstream dependency of a second BT; and
increment a UDC associated with the second BT based on removal of the second NBT from the WTS and determination the second NBT is an upstream dependency of the second BT.

13. The apparatus of claim 12, wherein backtracking on the WTS to remove the one or more NBTs from the WTS comprises instructions in the memory that when executed by the processor cause the processor to remove the second BT from an allocated barriers list and decrement an allocated barrier count based on a determination the WTS includes no NBTs with upstream or downstream dependencies to the second BT.

14. The apparatus of claim 12, wherein backtracking on the WTS to remove the one or more NBTs from the WTS comprises instructions in the memory that when executed by the processor cause the processor to:
determine the second NBT is a downstream dependency of the first BT; and increment a DDC associated with the first BT based on removal of the second NBT from the WTS and determination the second NBT is a downstream dependency of the first BT.

15. The apparatus of claim 1, the memory comprising instructions that when executed by the processor cause the processor to remove the first NBT from the TTS list based on addition of the first NBT to the WTS.

16. The apparatus of claim 1, the memory comprising instructions that when executed by the processor cause the processor to traverse the computation graph to generate the TTS list.

17. The apparatus of claim 1, the memory comprising instructions that when executed by the processor cause the processor to traverse the computation graph to generate a BT list, an NBT list, BT dependency data, and NBT dependency data.

18. The apparatus of claim 1, wherein the execution schedule is configured to run on a heterogeneous processor.

19. The apparatus of claim 18, wherein the heterogeneous processor comprises a neural network and an image processing accelerator.

20. The apparatus of claim 1, wherein the BTs comprise data objects inserted into an intermediate representation of the computation graph.

21. At least one non-transitory computer-readable medium comprising a set of instructions that, in response to being executed by a processor circuit, cause the processor circuit to:
add a first non-barrier task (NBT) from a schedulable task list to a working task schedule (WTS) utilized in production of an execution schedule for an inference process for a neural network application;
determine the first NBT is an upstream dependency of a first barrier task (BT) based on a computation graph comprising BTs and NBTs, wherein the BTs correspond to hardware barriers utilized during performance of the inference process;
reduce an upstream dependency count (UDC) associated with a first BT by a defined value from a current count value based on a determination the first NBT is an upstream dependency of the first BT;
determine the UDC associated with the first BT is zero; and
add each NBT that is a downstream dependency of the first BT to a tasks to schedule (TTS) list based on the determination of the UDC associated with the first BT is zero.

22. The at least one non-transitory computer-readable medium of claim 21, comprising instructions that, in response to being executed by the processor circuit cause the processor circuit to output the WTS as the execution schedule for the inference process when each NBT in the computation graph has been added to the WTS.

23. The at least one non-transitory computer-readable medium of claim 21, wherein the execution schedule for the inference process comprises a first in first out (FIFO) schedule of NBTs.

24. A computer-implemented method comprising:
adding a first non-barrier task (NBT) from a schedulable task list to a working task schedule (WTS) utilized in production of an execution schedule for an inference process for a neural network application;
determining the first NBT is an upstream dependency of a first barrier task (BT) based on a computation graph comprising BTs and NBTs, wherein the BTs correspond to hardware barriers utilized during performance of the inference process;
reducing an upstream dependency count (UDC) associated with a first BT by a defined value from a current value based on a determination the first NBT is an upstream dependency of the first BT;
determining the UDC associated with the first BT is zero; and
adding each NBT that is a downstream dependency of the first BT to a tasks to schedule (TTS) list based on the determination of the UDC associated with the first BT is zero.

25. The computer-implemented method of claim 24, comprising outputting the WTS as the execution schedule for the inference process when each NBT in the computation graph has been added to the WTS.

* * * * *